Fig. 5.

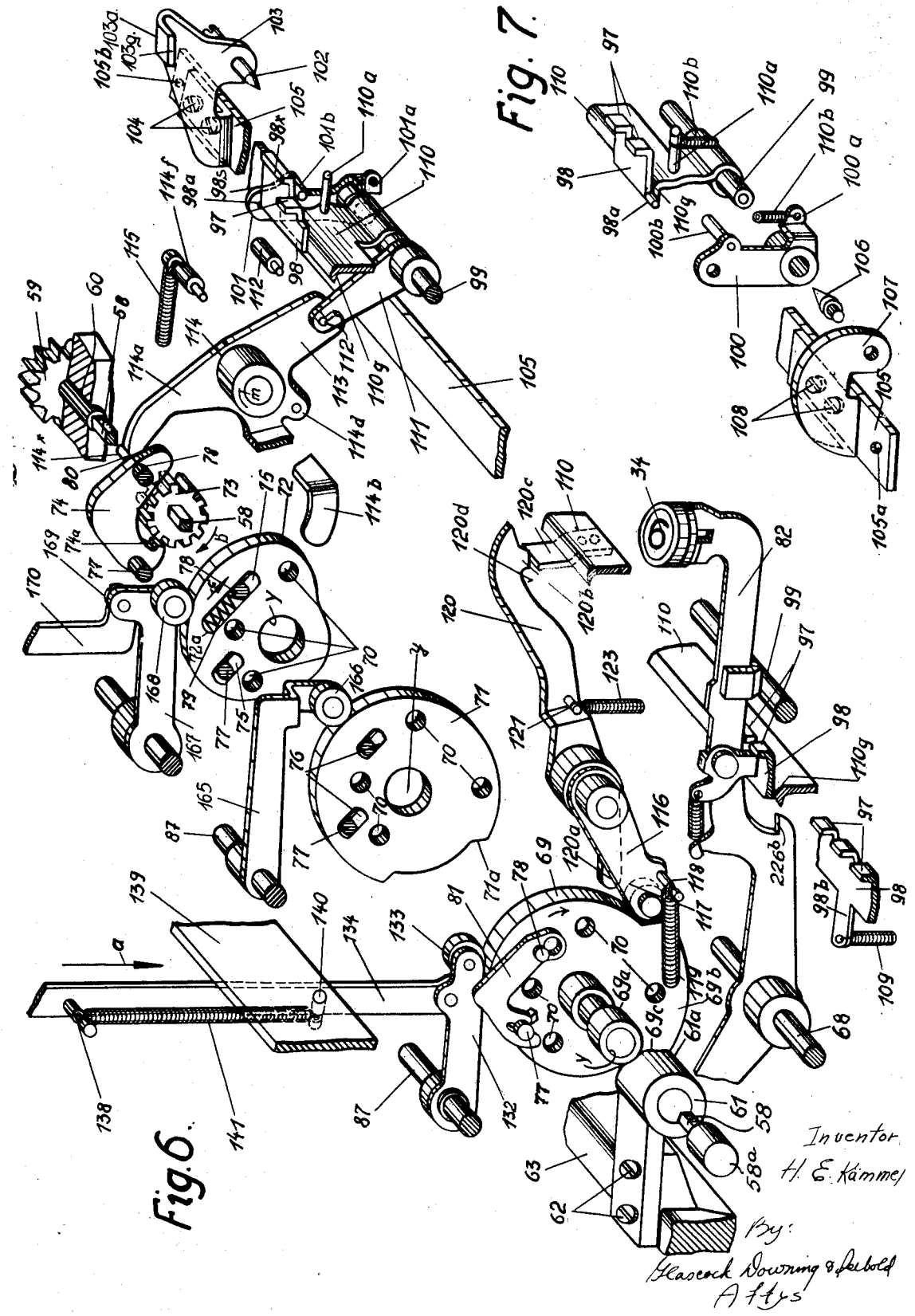

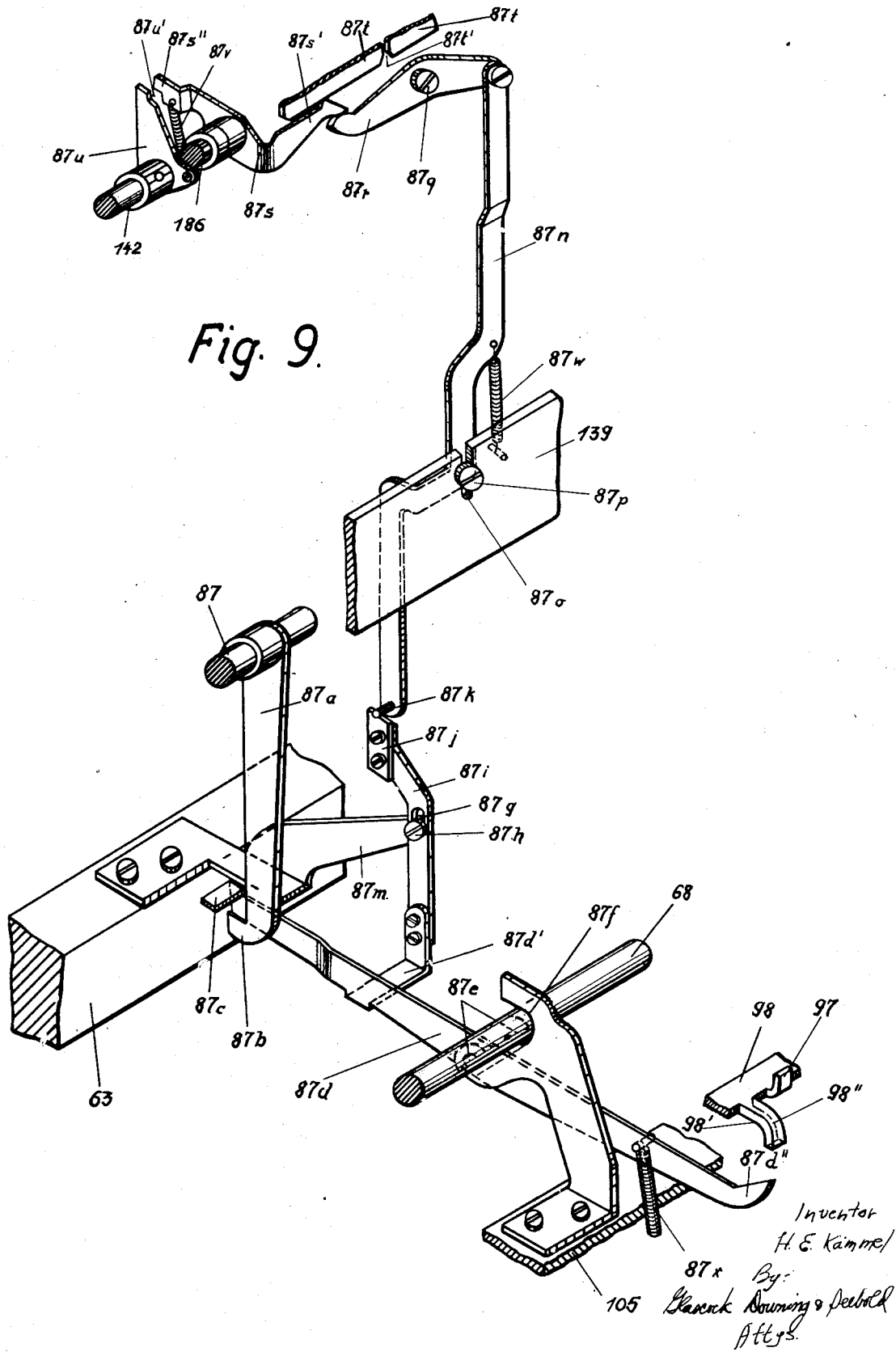

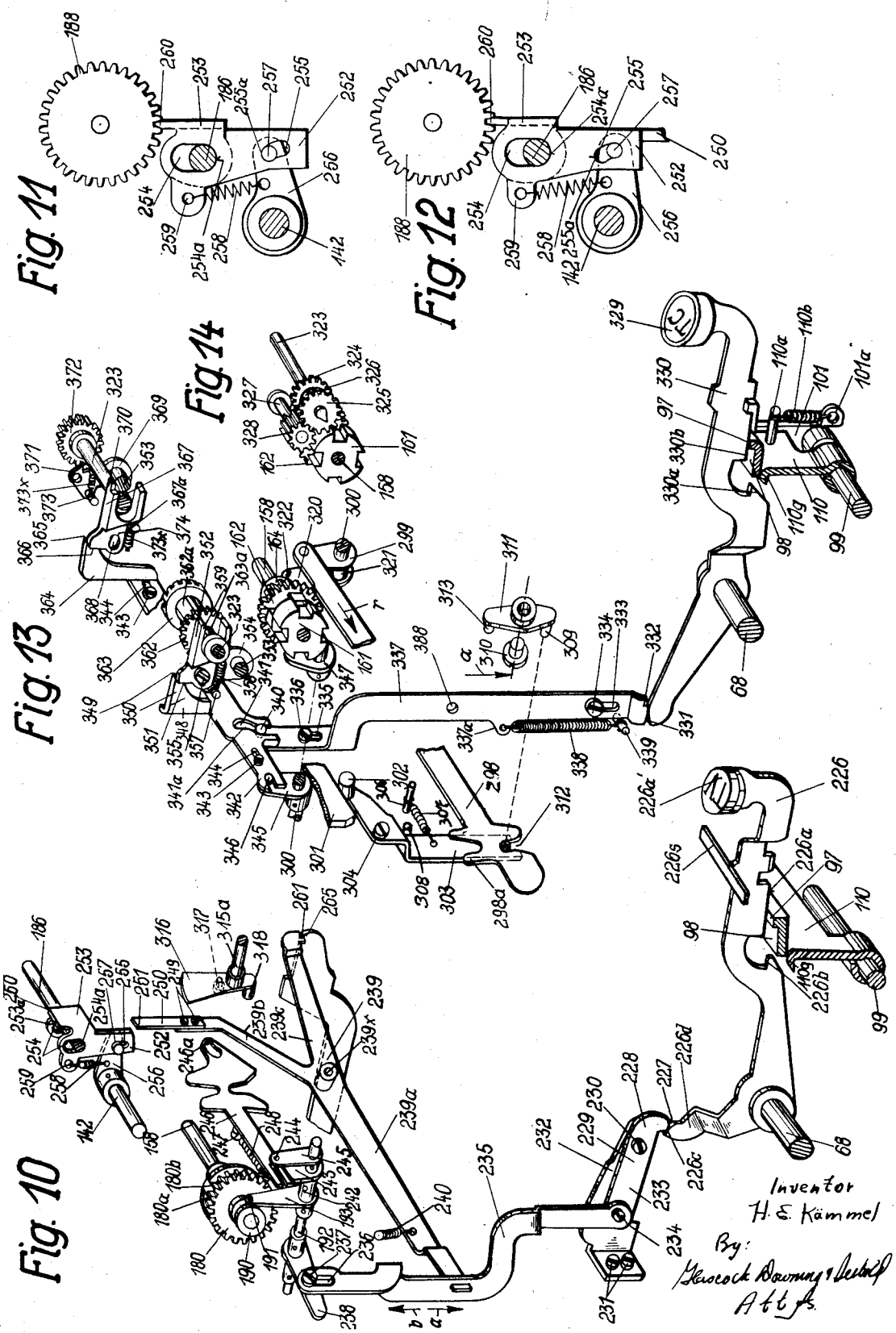

Fig. 17

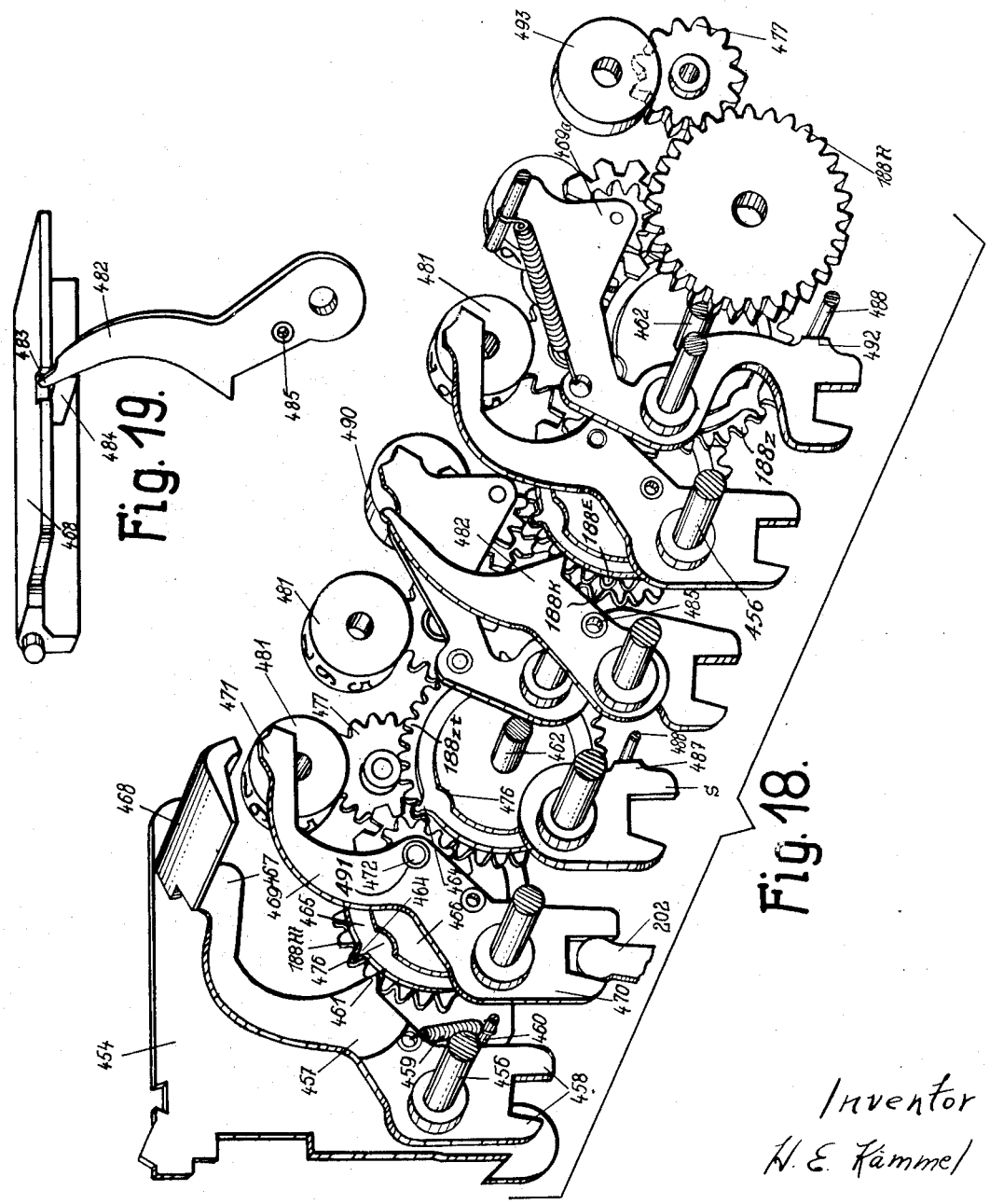

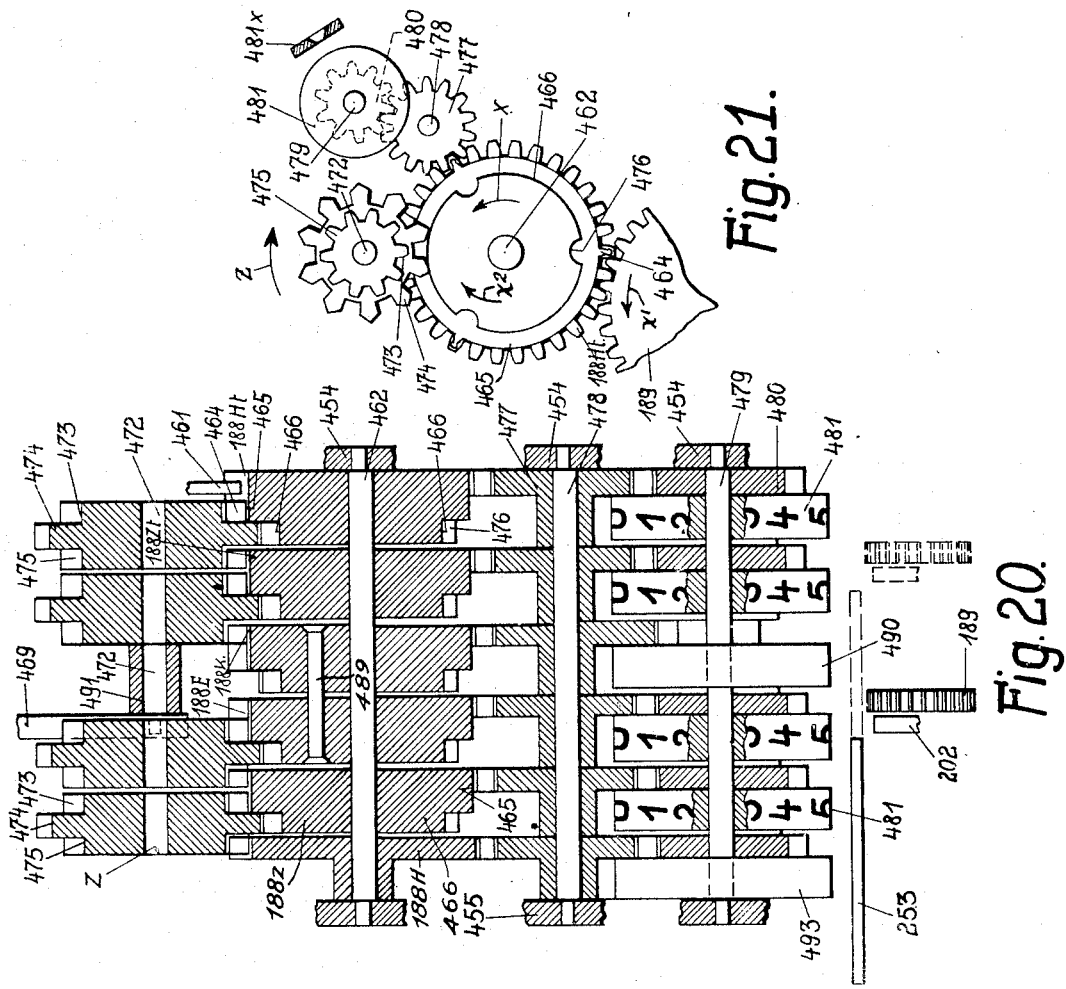

July 31, 1945. H. E. KÄMMEL 2,380,598
MECHANISM FOR CONTROLLING TOTAL AND SUBTOTAL TAKING
OPERATIONS FOR TYPEWRITING CALCULATING MACHINES
Original Filed May 14, 1934 15 Sheets-Sheet 14

Inventor
H. E. Kämmel
By Glascock Downing & Seebold
Attys.

Fig. 23

| 1 | 2 | 3 | 4 | 5 | 6 | 7 | 8 | 9 | 10 | 11 |
|---|---|---|---|---|---|---|---|---|---|---|
| Name | № | Month | Gross salary | Taxis | Sick fund | Assurance for employees | Supplements | Remainder | Net-salary | Sum of all Suplements |
| O.Schmidt. | 15 | Mai | 200.- | 10.00 | 6.00 | 4.00 | 3.75 | 0.55 | 184.30* | 4.30* |

Fig. 24

| Typing line | Col | №. Column. Totalizer | Reading Column. Totalizer | Type of Calc. Cross-Totlr. $Q_1$ | Type of Calc Cross-Totlr. $Q_2$ | Reading Cross Totalizer $Q_1$ | Reading Cross Totalizer $Q_2$ | Clear sign from Cross Totalizer |
|---|---|---|---|---|---|---|---|---|
| I | 1 to 3 | Name, number and month have to be registered. | | | | | | |
| I | 4 | $T_1$ | 200.00 | A | E | 200.00 | Zero | |
| I | 5 | $T_2$ | 10.00 | S | E | 190.00 | Zero | |
| I | 6 | $T_3$ | 6.00 | S | E | 184.00 | Zero | |
| I | 7 | $T_4$ | 4.00 | S | E | 180.00 | Zero | |
| I | 8 | $T_5$ | 3.75 | A | A | 183.75 | 3.75 | |
| I | 9 | $T_6$ | 0.55 | A | A | 184.30 | 4.30 | |
| I | 10 | $T_7$ | 184.30 | S | E | comes to zero | 4.30 | $Q_1$ |
| I | 11 | $T_8$ | 4.30 | E | S | Zero | comes to zero | $Q_2$ |

Inventor
H. E. Kämmel
By: Glascock Downing & Seebold
Attys.

Patented July 31, 1945

2,380,598

UNITED STATES PATENT OFFICE 2,380,598

MECHANISM FOR CONTROLLING TOTAL AND SUBTOTAL TAKING OPERATIONS FOR TYPEWRITING CALCULATING MACHINES

Hugo Ernst Kämmel, Zella-Mehlis, Germany; vested in the Alien Property Custodian Original application May 14, 1934, Serial No. 725,636. Divided and this application July 31, 1939, Serial No. 287,672. In Germany May 15, 1933

21 Claims. (Cl. 235—59)

The invention relates to a mechanism for controlling total and subtotal taking operations for typewriting calculating machines of the type exemplified in my co-pending application Ser. No. 725,636, filed May 14, 1934, now U. S. Patent No. 2,236,642, issued April 1, 1941, of which the present application is a division.

Hitherto, such devices had the disadvantage that their whole construction was more or less complicated, since for the withdrawal of the values, members were provided other than those for registration of the values. The devices for this reason were expensive in construction and their operation was unreliable.

One object of this invention is the provision in a typewriting-accounting machine of the general character of that herein disclosed, of a novel mechanical total printing control mechanism for automatically effecting an imprint of the total amount registered on the column register or column registers, or on one or more of the crossfooter totalizers, at will, without the use of hand cranks or similar manipulative devices.

Another object is to provide means to enable the typewriting-accounting machine to automatically print a total of the amount registered on a totalizer and coincidentally clear or return the totalizer wheels to zero seriatim, or to automatically print such amount as a sub-total, that is to say, by restoring the amount onto the totalizer wheels.

A further object is the utilization of the same mechanism to automatically print either a total or a sub-total at will.

Still another object is the provision of means controlled by separate keys, to automatically print totals from either the column totalizers or the crossfooter totalizers, depending upon the key depressed.

A still further object is to provide in a typewriting-accounting machine wherein the totalizer wheels are reversely rotated to zero seriatim automatically in a total printing operation, means operable incident to the total-taking operation whereby to restore to the wheels the amount thus removed, and thus convert the total printed into a sub-total.

Another object is the provision, in a typewriting accounting machine equipped with a column totalizer and with a crossfooter totalizer, one of which is axially shiftable relatively to the other, of a single sub-total control common to both kinds of totalizers, and effective in connection with the total-taking keys of the column and crossfooter totalizers, respectively, to transform a totalizing and clearing operation on either kind of totalizer, into a sub-totaling operation.

In the drawings, one example of construction of the subject of the invention is illustrated as applied to a Mercedes Addelektra typewriting calculating machine.

Figure 5:
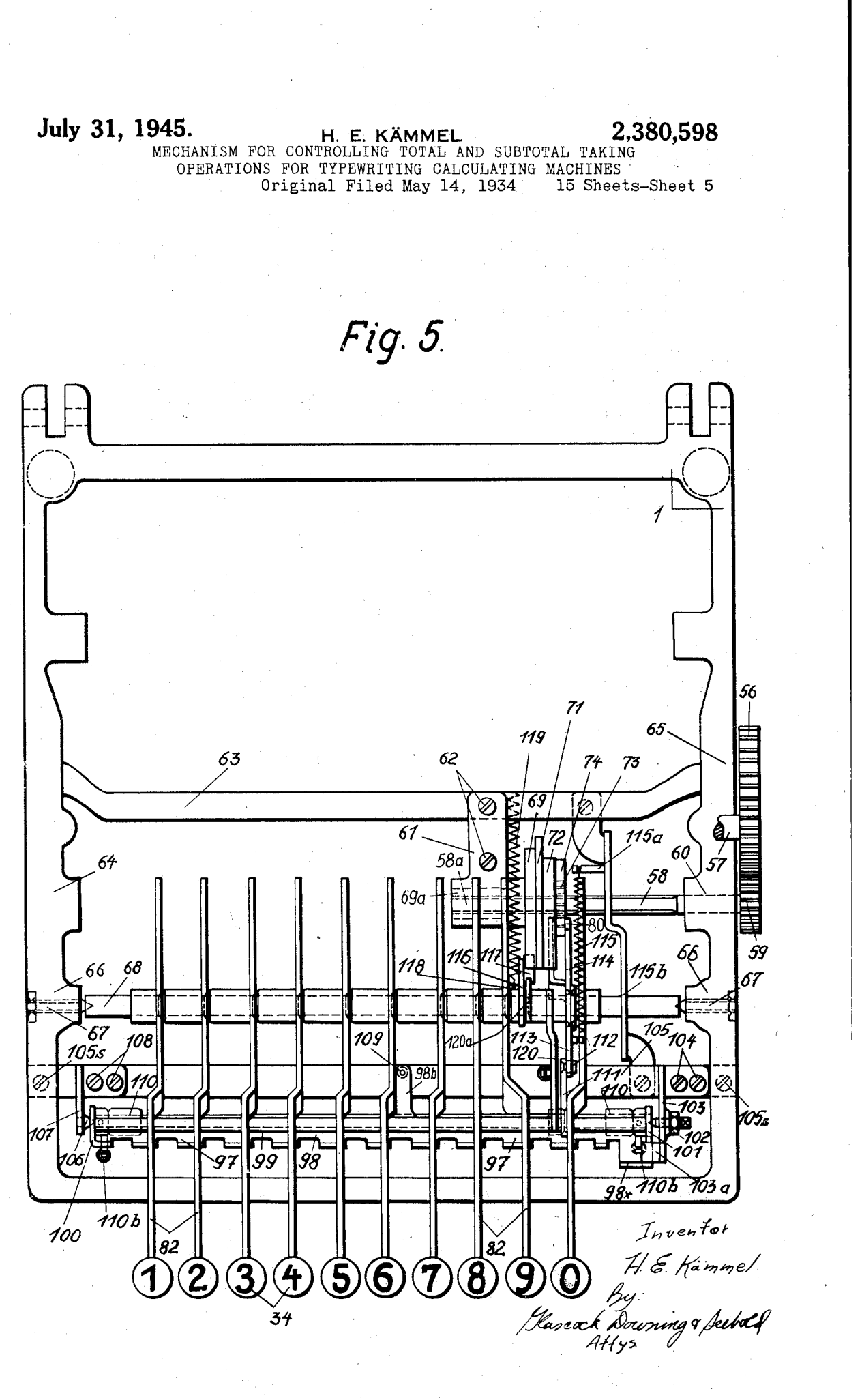

Figure 5 shows a plan of the drive mechanism together with the calculating keys and the drive coupling.

Figure 6 shows a perspective illustration viewed from the front left-hand side of the machine, of the drive coupling with the coupling setting member, common to all the calculating keys, in which view the individual parts for the sake of clearness are represented as separated from one another.

Figure 7 shows in perspective, details of the coupling setting member, the parts of which are likewise separated from one another.

Figure 8:
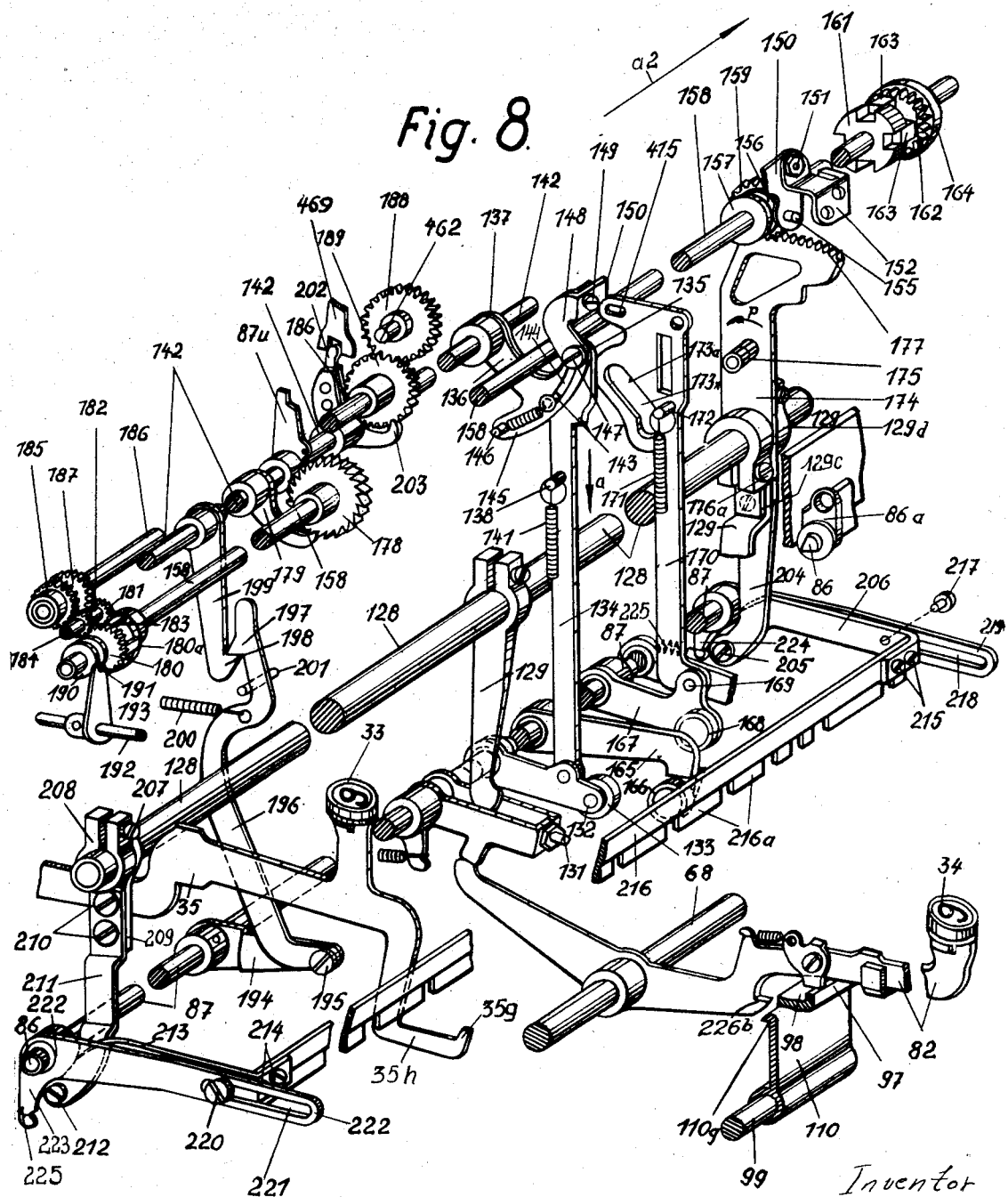

Figure 8 shows a perspective illustration of the transmission and control mechanisms arranged between the typing and calculating keys, viewed from the front left-hand side of the machine, together with the change-over or state control gear for the column totalizers and a part of the change-over or state control gear for the cross totalizers, in which view the individual parts are illustrated as separated from one another.

Figure 9 shows a perspective illustration of a locking mechanism controlled by the column totalizers, viewed from the front left-hand side of the machine.

Figure 10 shows a perspective illustration of a part of the total-taking mechanism for the column totalizers viewed from the front left-hand side of the machine, together with a part of the change-over or state control mechanism for the column totalizers and the total sign printing mechanism for indicating totals taken from the column totalizers, in which view the parts are illustrated partially drawn out from one another.

Figures 11 and 12 show detail parts in respect to the column register total-taking mechanism illustrated in Figure 10, in two different positions.

Figure 13 shows a perspective illustration of a part of the total-taking mechanism for the cross totalizers, with the printing mechanism for the sign in addition thereto and a part of the change-over gear including both the driving or master wheels for the cross totalizers, the view being taken from the front left-hand side of the machine and various parts being illustrated drawn out from one another.

Figure 14 shows in perspective the change-over gear for the cross totalizers viewed from the front left-hand side of the machine.

Figure 15:
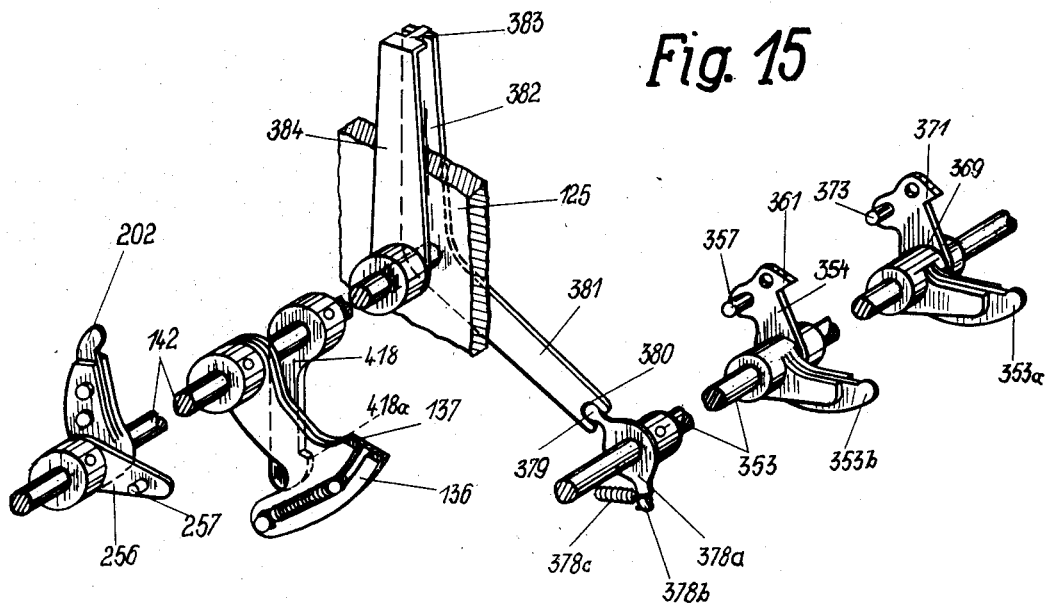

Figure 15 shows in perspective the unlocking mechanisms for the column and cross totalizers, viewed from the front left hand side of the machine.

Figure 16:
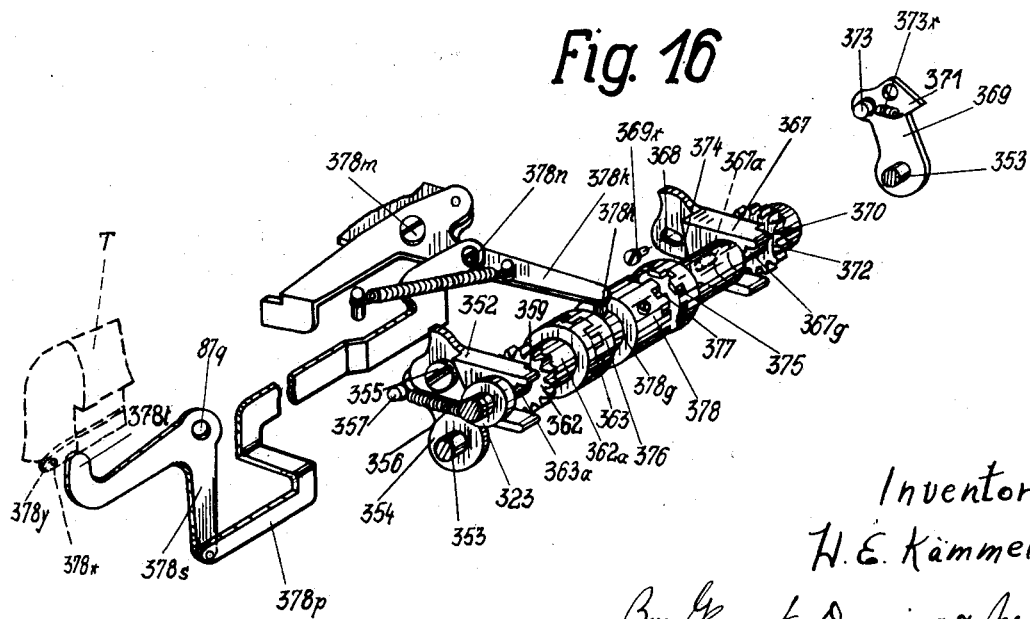

Figure 16 shows in perspective the control, known in itself, for the coupling arranged between both the driving or master wheels of the cross totalizers, viewed from the front left-hand side of the machine.

Figure 1:
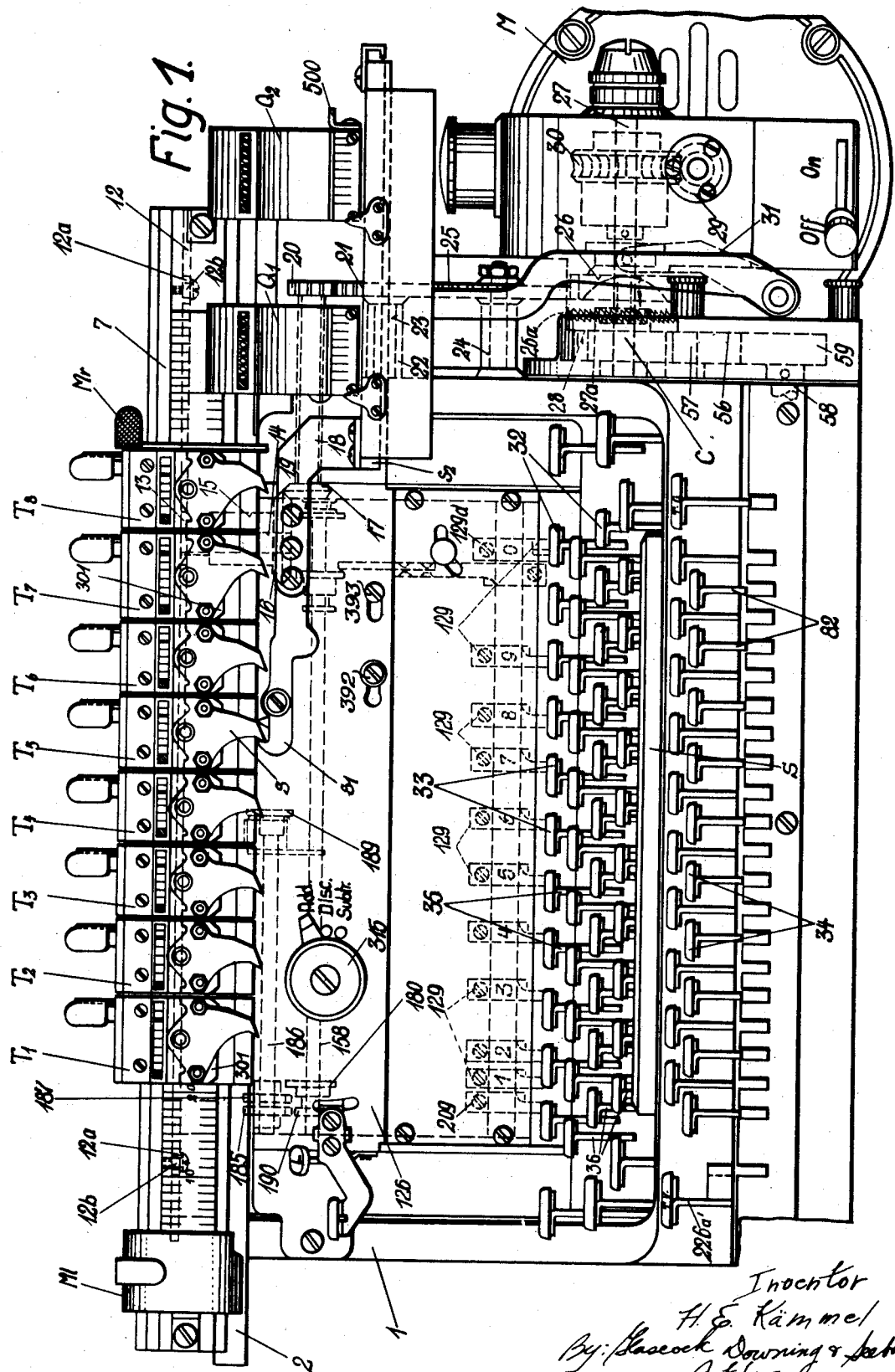
Figure 1 shows a front elevation of the whole typewriting calculating machine.
Figure 2:
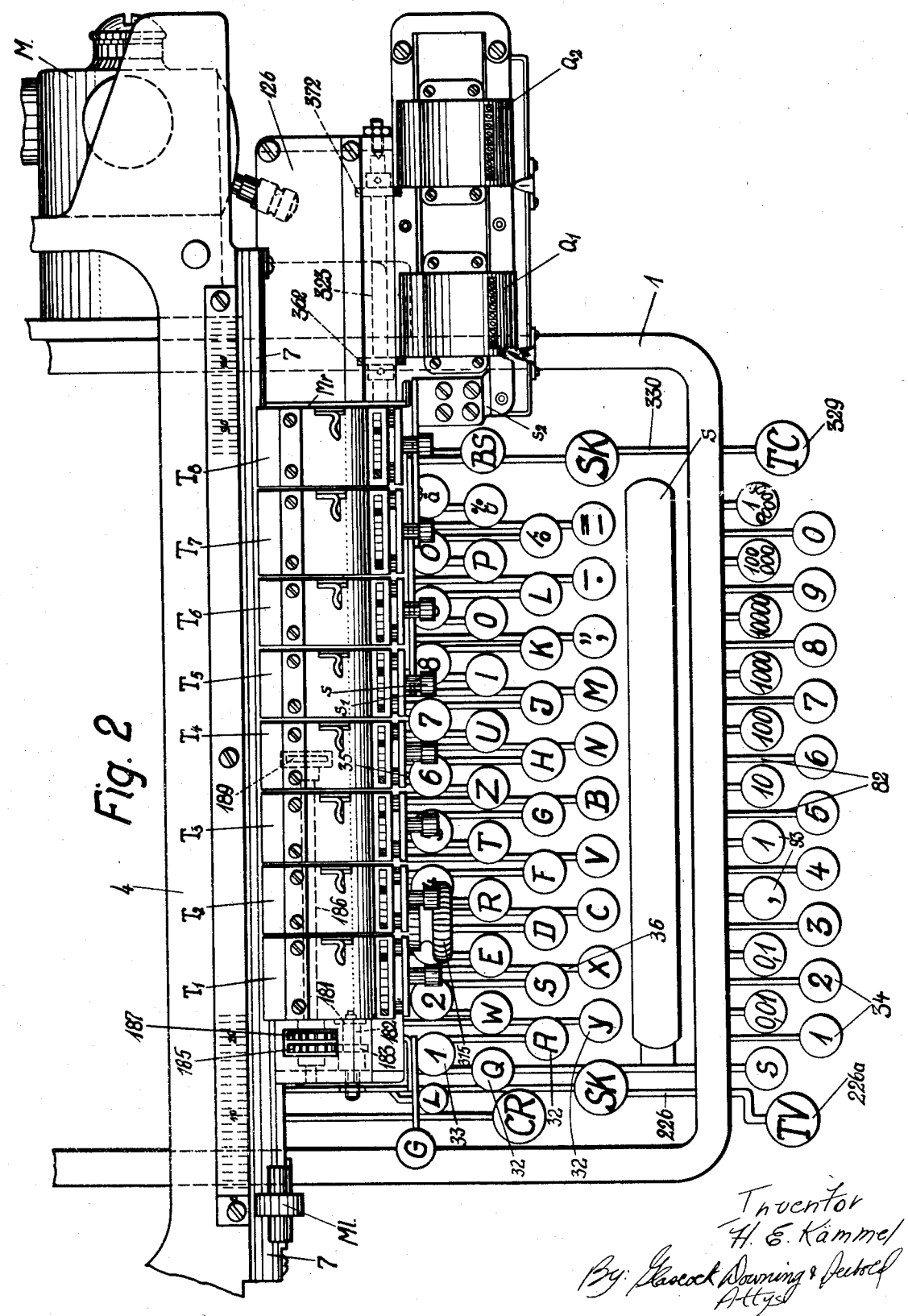
Figure 2 shows a plan of the machine according to Figure 1.
Figure 17:
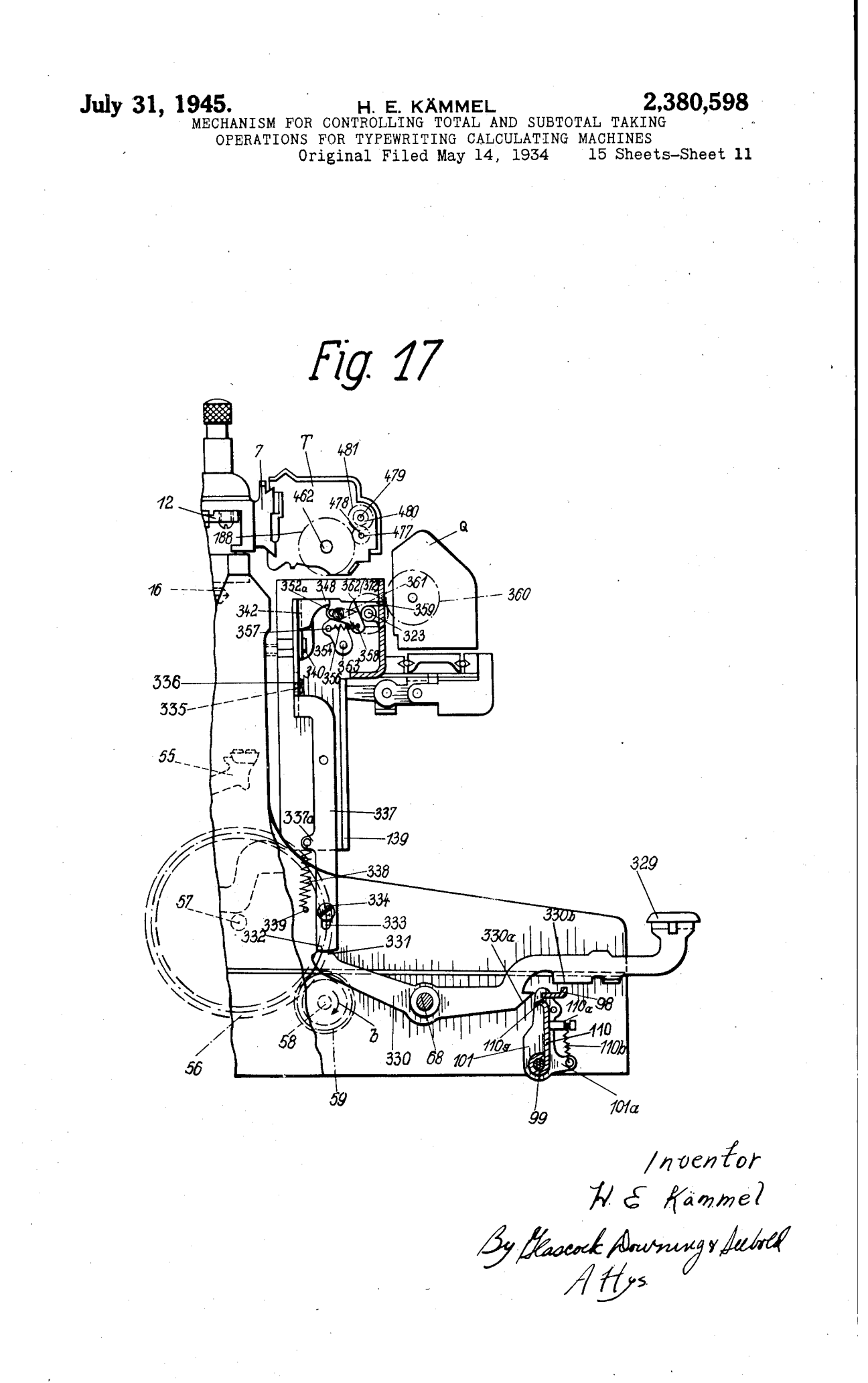

Figure 17 shows a partial side elevation of the machine viewed from the left-hand side of Figure 1, in which parts of the machine housing are broken away to disclose the mechanisms of the total-taking arrangement for the cross-totalizers, parts being illustrated in section.

Figure 18 shows a perspective arrangement of a column totalizer viewed from the rear, in which view the detail parts are illustrated in a condition separated from one another.

Figure 19 shows a perspective illustration of a locking lever with its locking flap, viewed from the left-hand edge of the rear side of the totalizer.

Figure 20 is a cross-section through a totalizer slightly modified for the present invention in which view for the sake of better apprehension, the individual wheels with their shafts are disposed in one plane.

Figure 21 shows a detail train of denominational gearing in a column totalizer.

Figure 22:
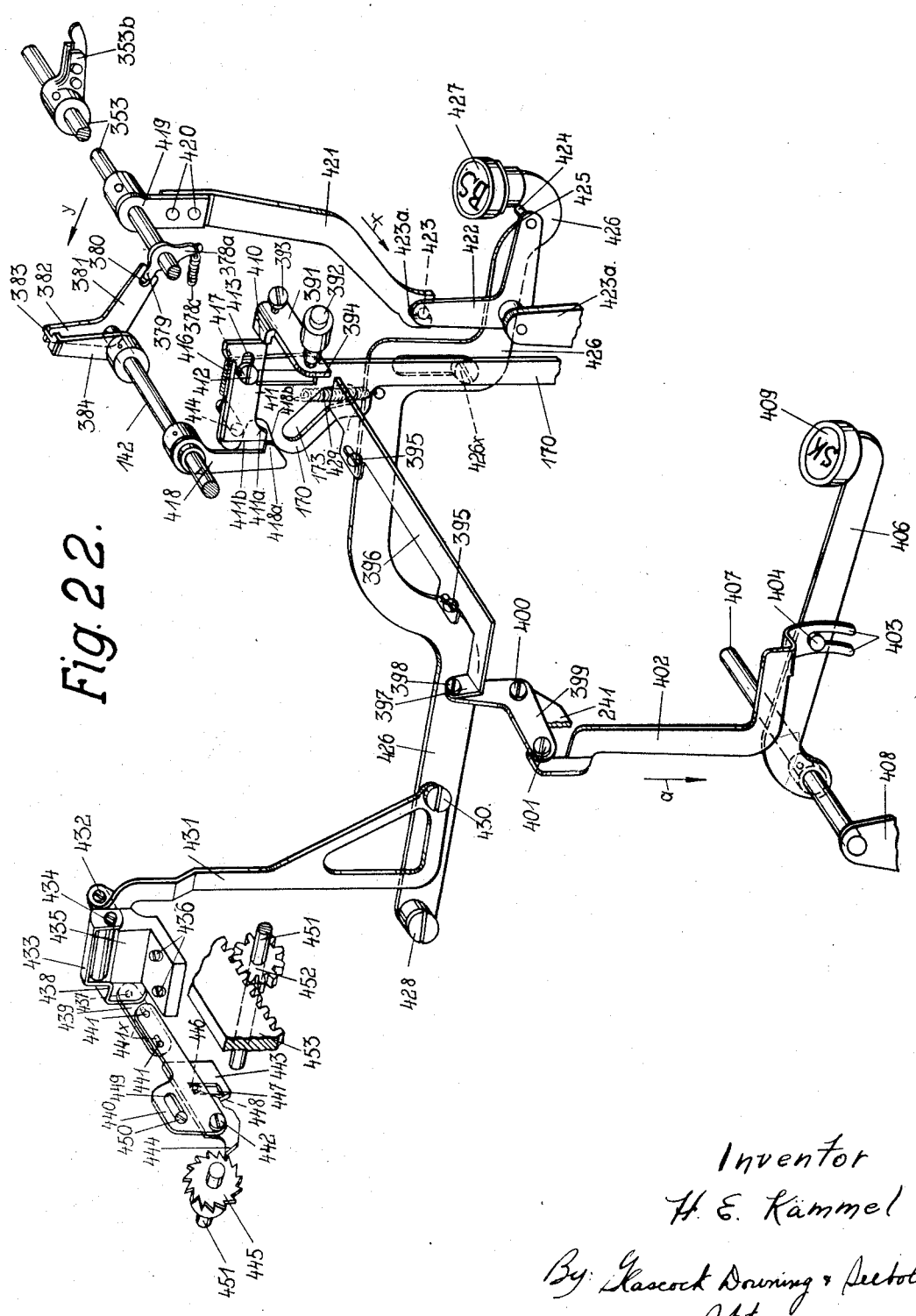

Figure 22 shows a perspective illustration of the control mechanism for sub-total taking, viewed from the front left-hand side of the machine.

Figure 23 shows a partially illustrated sheet, filled in with an example illustrating one of the uses to which a machine embodying this invention, may be applied, and Figure 24 shows in the form of a table, the various operations performed by the machine according to the example illustrated in Figure 23.

In the accomplishment of the foregoing objects, I have adapted the well-known Mercedes Addelektra typewriting-accounting machine to the desired purposes.

In such Mercedes machine, it is old to provide the usual paper carriage with one or more column totalizers or column registers, the denominational wheels of which totalizers are fed one by one into and out of mesh with a column totalizer master wheel.

One or more crossfooter totalizers are slidably mounted on the frame of the machine, with a pick-up bar releasably engageable by the respective column totalizers, to step the denominational wheels of the crossfooter totalizers one by one into and out of engagement with master wheels individual to the respective crossfooter totalizers.

Carriage controlled crossfooter totalizer selecting means is provided to enable either or both crossfooter totalizers to accumulate amounts simultaneously with any one or more of the column totalizers, where more than one cross totalizer is present.

A set of calculating numeral keys are mounted in the frame of the machine to variously limit the excursions of a toothed differential actuator 174 (Fig. 8), normally out of mesh with a drive pinion 159, fast on a differential shaft 158.

A state control reversible gearing is provided near each end of the differential shaft to control the direction of rotation of the column totalizer master wheel 189 (Fig. 8), and of the crossfooter master wheels 362 and 372 (Fig. 16).

Manual control of the state control gearing for the column totalizer master wheel is also provided.

Depression of any calculating numeral key (Fig. 8) not only sets its associated stop in the path of an arm individual to said stop to arrest the differential actuator 174, but also trips a clutch to enable the motor to drive a group of cams, three in the present instance.

One of the cams 69 releases for operation a spring-pressed slide 134 which not only shifts the drive pinion 159 into mesh with the differential actuator 174 common to all the calculating numeral keys, but also releases certain locks to enable the digit corresponding to the calculating key depressed, to be entered additively or subtractively, in the particular numeral wheel of the column totalizer at that time engaged with the column totalizer master wheel 189, and in either or both of the denominationally corresponding numeral wheels of the crossfooter totalizers Q1, Q2 if such crossfooters have been brought into mesh with their respective master wheels, and selected for operation.

A second cam 72 releases a spring-pressed differential slide 170 connected with the differential actuator 174 to rock the latter rearwardly, whereby the drive pinion 159 is rotated to greater or lesser degree depending upon the length of travel permitted the stop arm 129 by its stop 131, to effect the entry of the value corresponding to the digit on the depressed calculating numeral key, into the column and crossfooter totalizers.

The differential actuator 174 communicates its differential movement to a sliding bail 206, 216, 213 to position the latter operatively relatively to the nose of a series of graduated noses mounted on the several numeral printing keys, corresponding in value to the depressed calculating numeral key.

Thereafter, and in timed relation with the differential cam 72, the third cam 71 releases the differentially positioned bail 206, 216, 213 to the action of springs which rock the bail downwardly to depress the selected numeral printing key, whereby the latter engages its corresponding type action with a power drive to effect an imprint of the digit corresponding with the calculating numeral key depressed.

Thereafter, or coincident therewith, the lock-controlling cam 69 restores the several locks to their normal positions and disengages the drive pinion from the differential actuator; the printing control cam 71 raises the numeral printing key depressing bail and the differential actuator control cam 72 retracts the key depressing bail and the differential actuator to their respective idle positions.

All of the foregoing is illustrated and explained in the parent application, now Patent No. 2,236,642.

The present invention resides in the utilization of the foregoing mechanism, in a typewriting-accounting machine, under the control of certain additional devices, for the automatic, mechanical printing of totals accompanied by a clearing of the totalizer, either column or crossfooter, and for the printing of sub-totals from either the column or crossfooter totalizer, by first clearing such totalizer and then returning the amount thereto.

*General machine description*

The machine housing 1 (Figures 1 and 3) carries by means of rails 2 and 3 the paper carriage 4, in which a platen 5 (Figure 3) is arranged. To the front side of the paper carriage, there is fixed a supporting rail 7, for carrying the column totalizers T.

To the right-hand side of the paper carriage 4, the carriage release lever 8 (Figure 3) is swingably mounted, and to an extension of this lever a carriage release bar 9, is fixed. This bar is rigidly connected at its other side, with a lever 10, pivoted on the left-hand side of the paper carriage, at 11.

The carriage release lever 8, release bar 9 and lever 10 form part of the mechanism for releasing the usual carriage escapement mechanism in the usual manner, which mechanisms being well known in the art, have not been illustrated in detail and need not be further described.

For line-spacing and for the return of the paper carriage there is, further, on the carriage 4, a rack 12 (Figures 1 and 3) adjustably mounted by screws 12b engaging with the slots 12a. With the rack 12, engages a toothed wheel 13, which is pinned on a shaft 14. This shaft is mounted in a stationary bearing 15, and carries a rigidly mounted bevel wheel 16 on its lower end, remote from the toothed wheel 13. With the bevel wheel 16, engages a bevel wheel 17 (Figure 1) fixed on a shaft 18.

*Keyboard mechanism*

The shaft 18 is rotatably mounted in a bearing 19, rigidly connected to the machine frame, and at its outer end, is provided with a spur wheel 20, in mesh with an intermediate gear 21 rotatably mounted on a shaft 23 arranged in the bearing 22. The intermediate gear 21, in turn, meshes with a second intermediate gear 25 rotatably mounted on the shaft 24, said second intermediate gear meshing with a spur wheel 26, constituting one member 26a of a coupling. The wheel 26, is loosely rotatable and axially displaceable on a part 27 (Figure 1) of a drive shaft C (Figure 3) which operates the type levers. A co-acting coupling member 27a, having a spur wheel 28, is fixed on the part 27 of the drive shaft C. The shaft C, is rotated in the direction of the arrow a (Figure 3) by means of a worm 29 (Figures 1 and 3), and a worm wheel 30, driven by a motor M arranged on the right-hand side of the machine.

The line spacing and the carriage return are effected by bringing the coupling member 26a into engagement with the coupling member 27a, by a lever 31, operated by the right-hand margin stop Mr (Figure 1). Such engagement of said coupling members and operation of said lever 31 operates the hereinbefore described driving train to the gear 13 and the rack 12, to effect line spacing of the platen 5 and the return of the carriage to the right in a manner and by associated means fully described in U. S. patent to Schluns, No. 1,582,788 to which attention is directed. The opening of the coupling, 26a, 27a, is effected by the left-hand margin stop Ml, as the paper carriage 4 arrives at its extreme right-hand position, to uncouple said coupling members 26a and 27a. The typewriter mechanism proper comprises letter keys 32, number keys 33 and calculating keys 34 (Figs. 1, 2, 3 and 8) mounted upon key levers 36, 35 and 82, respectively. The key levers 35 and 36 rock downwardly around pivot 37 (Fig. 3), against the action of springs 38. The calculating keys 34 act indirectly on the number key levers 35 in a manner and by means described under the headings, "Operation of the calculating mechanism" and "Operation of the automatic printing mechanism." By means of a pin 40, a driving pawl 41, is mounted on each of the letter and number printing key levers 35, 36, and this pawl is so acted upon by the tension spring 42, that its lug 43 rests against a nose 44, of a key lever 35, 36. The nose 45, of the driving pawl 41, engages over a nose 46, of the draw hook 49, jointed to the intermediate lever 47, by a pin 48. A spring 50 tends to rock the draw-hook counter-clockwise against a stop 51, whereby its normal position is determined.

On the draw-hook 49, the control tooth 49c, provided with two teeth 49a and 49b, is rotatably mounted on the pin 49d. If one of the typing keys, 35 or 36 is depressed, the associated control tooth 49c engages a fluted section of the drive shaft C as described in the patent to Schulze, No. 1,789,661, dated Jan. 20, 1931. The control tooth 49c is first of all rotated slightly and then takes the draw-hook 49 along with it to the right so that the intermediate lever 47 is swung round the shaft 52, in the clockwise direction. Accordingly, the type lever 54, is swung in the anti-clockwise direction round the shaft 55, and strikes against the platen 5.

The spur wheel 28 (Figure 1) non-rotatably mounted on the shaft 27 (Figure 1) engages with an intermediate spur wheel 56, rigidly mounted on the shaft 57. The intermediate spur wheel 56, in turn, meshes with the spur wheel 59, rigidly mounted on the shaft 58 (Figures 1, 3, 5, 6 and 17).

The above described mechanisms do not belong to the invention but have been briefly described for the better understanding of the parts to be hereinafter described, belonging to the invention.

*Drive for the calculating mechanism*

The calculating mechanism drive shaft 58 (Figures 3, 5, 6), is rotatably mounted in the bearing eye 60, arranged in the right hand side of the machine housing 1, and at its opposite end, the part 58a, of the shaft 58, is rotatably mounted in a bearing 61, fastened by screws 62, to a bridge or cross brace 63 connecting the two side walls, 64 and 65 of the frame 1. A fulcrum rod 68, (Figures 3, 5, 6, 8, 9, 10, 13 and 17) is rigidly mounted by set screws 67, screwed into bosses 66 (Figure 5) on the left and right hand side walls 64 and 65 of the machine housing 1, and on this rod, members to be hereinafter described, are swingably mounted.

In the bearing eye 61 (Figures 5 and 6), a cam, 69 (Figures 3, 5, 6) is rotatably mounted by the sleeve 69a, rigidly fixed to the cam. The cam 69, is rigidly connected to the cams 71 and 72, by screws (not illustrated) which pass through holes 70, of the cams. The shaft 58, however, exercises no control over the cams, since the cams 69, 71 and 72, as well as the sleeve, 69a, have greater bores $y$ (Fig. 6) than the diameter of the shaft 58. The cams 69, 71 and 72 are prevented from lateral displacement by contact of the left side 69b, of the cam 69, with the edge 61a of the bearing eye 61 and by contact of the right side of the cam 72, with the toothed wheel 73 non-rotatably mounted on the square shaft 58. The toothed wheel 73, participates in the rotation of the square shaft 58, which continually rotates in the arrow direction $b$ (Fig. 6). On the cam 72, a pawl 74 (Figures 5, 6) is displaceably arranged by means, of pins 77 and 78, which engage in parallel elongated slots 75 of the cam 72, the pins 77 being of sufficient length to pass through elongated slots 76 of the cam 71, and in elongated slots, (not illustrated) in the cam 69. The pawl 74, is acted on continually in the direction of the arrow $c$ (Figure 6) by a compression spring 79, which abuts against the pin 78, fixed to the pawl 74, and against the end 72a, of the slot 75, in the cam 72. Moreover, a stud 80 formed on the pawl 74, coacts with a clutch disabling part, to be hereinafter described in detail, by which the tooth 74a of the pawl 74, is held out of engagement with the toothed wheel 73. A locking member 81 engages ring grooves (not illustrated) in the ends of the pins 77 and 78 of the pawl 74, which project from the left-hand side of the cam 69, in the manner illustrated in Figure 6, so that the pawl 74 is retained connected with the cams 69, 71 and 72, and prevented from falling out. It may be remarked at this point that for the whole ten calculating keys 34, only one coupling as just described, is necessary.

A downwardly directed wide projection 226a (Figure 10) of a column register total key 226a' is capable of co-acting with one of a series of upwardly bent lugs 97 of a rocking latch bar 98. On the right and left hand ends of the latch bar 98, pins 98a (Figures 6 and 7) are formed, one pin being arranged at each end. By means of these pins, the latch bar 98, is swingably mounted on the levers 100 and 101, rigidly mounted on opposite ends of the shaft 99. The shaft 99, at its right hand side, is rotatably mounted by a set screw 102 (Figure 6) in a bearing member 103, fixed to a bar 105, by screws 104. On the left-hand side of the machine, the shaft 99, is rotatably mounted by a cone bearing 106 (Figure 7) in a bearing member 107, fixed with screws 108, to the bar 105, already mentioned. The bar 105 is fixed to both side walls 64 and 65 of the machine housing 1, by screws 105s (Figure 5) which pass through holes 105a and 105b (Figures 6 and 7) of the bar 105.

By means of a spring 109 connected to a lug 98b of the latch bar 98, and to a pin 99g (Fig. 3) rigidly fixed to the shaft 99, the latch bar 98, is acted on in the anti-clockwise direction round its pins 98a, so that its upper surface presses upwards against a bent lug 103a (Figure 6) on the bearing block 103, whereby the normal position of the bar 98, is determined.

A key locking bar 110 (Figures 3, 6, 7) is swingably mounted at its opposite ends on the shaft 99, in the manner indicated in Figures 6 and 7. At the right-hand and left-hand ends of the key locking bar 110, further, pins 110a are fixed, with each of which a spring 110b (in Figure 6 this has not been illustrated for the purpose of rendering other parts visible), engages, which springs are connected to bent lugs 100a or 101a of the levers 100 and 101. By means of these springs 110b the key locking bar 110 is always acted upon round the shaft 99 in the clockwise direction, whereby its normal position is determined by contact with the pin 100b, riveted to the lever 100, and by contact with the pin 101b riveted to the lever 101. The rearwardly bent flange 110g extending along the upper edge of the locking bar 110, is capable of co-acting with the nose 226b (Figure 10) formed on the total key lever 226, in a manner to be hereinafter described.

On the shaft 99 (Figures 3, 6, 7), further, a lever 111 is rigidly mounted, to the free end of which a pin 112 is riveted (in Figure 6 for the sake of illustration the same is indicated in the withdrawn position). The pin 112 of the lever 111, co-acts with the fork-shaped end of an arm 113, of a three-armed lever 114, swingably mounted on the fulcrum rod 68. The arm 114a of the three-armed lever 114, co-acts with the stud 80 of the pawl 74, while the arm 114b, is wiped by the cam 72, in a manner hereinafter described. A spring 115 engages with a pin 114f (in Figure 6, the pin 114f is shown removed from the lever 114 for purposes of illustration) riveted to the nose 114d (Figure 6) of the three-armed lever 114, the spring at its other end being connected to a pin 115a (Figure 5) on a stay 115b, fixed to the cross brace 63 and to the cross bar 105. By means of this spring, the three-armed lever 114, is acted on in the direction of the arrow $m$ (Figure 6) round the rod 68, in consequence of which the lever 111 connected to it, the shaft 99, and the levers 100 and 101 pinned to the shaft, the locking bar 110 and finally the bar 98, are acted upon in the anti-clockwise direction, whereby on the one hand, the upper edge of the lug 98x, under the action of the spring 109, and on the other hand, its edge 98s under the action of the spring 115, contacts with the edge 103g of the lug 103a of the bearing member 103, whereby the normal position of the parts 114, 111, 99, 100, 101, 110 and 98, is determined.

Further, on the fulcrum rod 68, a lever 116 (Figures 3, 6) is swingably mounted, at the free end of which a roller 117 is arranged, capable of co-acting with the cam 69. By means of the spring 119, connected to the pin 118 of the lever 116, and to the cross brace 63, the roller 117, is always maintained in contact with the cam 69.

The lever 120, similarly swingably mounted on the rod 68, is likewise capable of co-acting by its rearwardly directed arm 120a with the cam 69. The spring 123 which connected to the pin 121 and to a pin 122 (Figure 3) of the cross bar 105, rocks the lever 120, clockwise round the rod 68, whereby the projection 120b (Figure 6) of this lever contacts with a lip 120c, fixed to the locking bar 110, and the normal position of the lever 120 is thereby determined.

A casing 125, 126, (Figs. 1, 3 and 4), for enclosing the calculating mechanism, extends between and is secured to the forward edges of the sides of the machine frame 1.

The inner ends of pivot set screws 127, mounted in the casing side frames 125, support a shaft 128 for rotation.

A shaft 87, (Figs. 3, 4, 6 and 9), parallel with and beneath the shaft 128, is similarly supported on the inner ends of set screws 86 mounted in angle brackets 86a secured to the side frames of the machine.

*Carriage-controlled calculating key lock*

On the shaft 87, (Figure 9) a lever 87a is pinned capable of co-acting by its nose 87b, with the lug 87c of a locking lever 87d pivoted at 87e on a supporting member 87f, fastened to the cross bar 105, and which by means of its fork-shaped part 87f, embraces the fulcrum 68, and thus supports the same. An upwardly bent arm 87d' on the locking lever 87d is fastened to the lower end of a sensing bar 87i, guided by a slot and pin connection 87g, 87h, with a fixture 87m. The upper end of the sensing bar 87i carries a setting finger 87j to feel a pin 87k projecting from the lower end of a link 87n, guided on the rear face of the front wall 139, of the calculating casing by a pin and slot connection 87o, 87p. At its upper end, the link 87n, is jointed to one arm of a lever 87r, rotatable on the pivot 87q (Figure 9). The remaining arm of the lever 87r co-acts with a lever 87s, rotatably mounted on the shaft 186 (Figure 8), the nose 87s', (Fig. 9), is acted upon by the cams 87t, arranged on the column totalizers.

The lever 87s, moreover, co-acts with a locking lever 87u, mounted on the locking shaft 142, which locking lever is connected with the lever 87s by a spring 87v. If no cam 87t, of a column totalizer lies over the nose 87s' of the lever 87s, or if the nose 87s' lies in the intermediate space 87t' between adjacent cams 87t, the nose 87s'' of the lever 87s, lies in the path of the shoulder 87u' of the lever 87u under the action of the spring 87v, whereby the rest position of the lever 87s is determined. When the lever 87s is in the rest position, the lever 87r is swung in the clockwise direction around the pivot 87q under the action of the spring 87w, which engages with the link 87n. Hereby the lever 87r lies against the nose 87s' of the lever 87s whereby the rest position of the parts 87r and 87s is determined.

In this case, also, the lever 87d is swung by the bar 87i, in the anti-clockwise direction against the action of the spring 87x which engages with the lever 87d, and which is weaker than the spring 87w, whereby the lug 87c, of the lever 87d, moves in front of the nose 87b, of the lever 87a and prevents the lever 87a from swinging in the clockwise direction. Similarly, the nose 87d'' of the locking lever 87d moves behind the edge 98' of the hook 98'' of the latch bar 98, whereby a swinging of the latch bar 98 in the anti-clockwise direction, is prevented.

*Automatic lock release mechanism*

A roller lever 132, is loosely rotatable on the shaft 87 (Figures 6 and 8) and on the free forwardly-directed end of this lever, a roller 133, is mounted capable of co-acting with the cam 69, hereinbefore described. To the roller lever 132, is jointed a draw-bar 134 which, at its upwardly directed free end, is jointed by means of a screw 135 (Figures 3, 4 and 8) to the segment lever 137, loosely rotatable on the locking shaft 142. By means of a spring 141 connected with the pin 138, rigidly mounted on the draw-bar 134 and to a pin 140, rigidly mounted on the front wall 139 (Figures 3 and 6) of the calculating casing 126, the draw-bar 134, is acted upon always in the direction of the arrow a (Figures 6 and 8), so that the roller 133, is always maintained in contact with the cam 69.

The locking shaft 142, is journaled at its ends on pivot set screws (not illustrated) mounted in the two side walls 125 of the calculating casing 126. To the lever 137, a pin 143, is fixed, which projects through an arcuate slot 144, in a lever 136, rigidly mounted on the locking shaft 142. A spring 145, engages with the pin 143, of the lever 137, the other free end of the spring being connected to a pin 146, fixed to the lever 136, whereby both levers 136 and 137 are yieldingly connected to one another.

Figure 3:
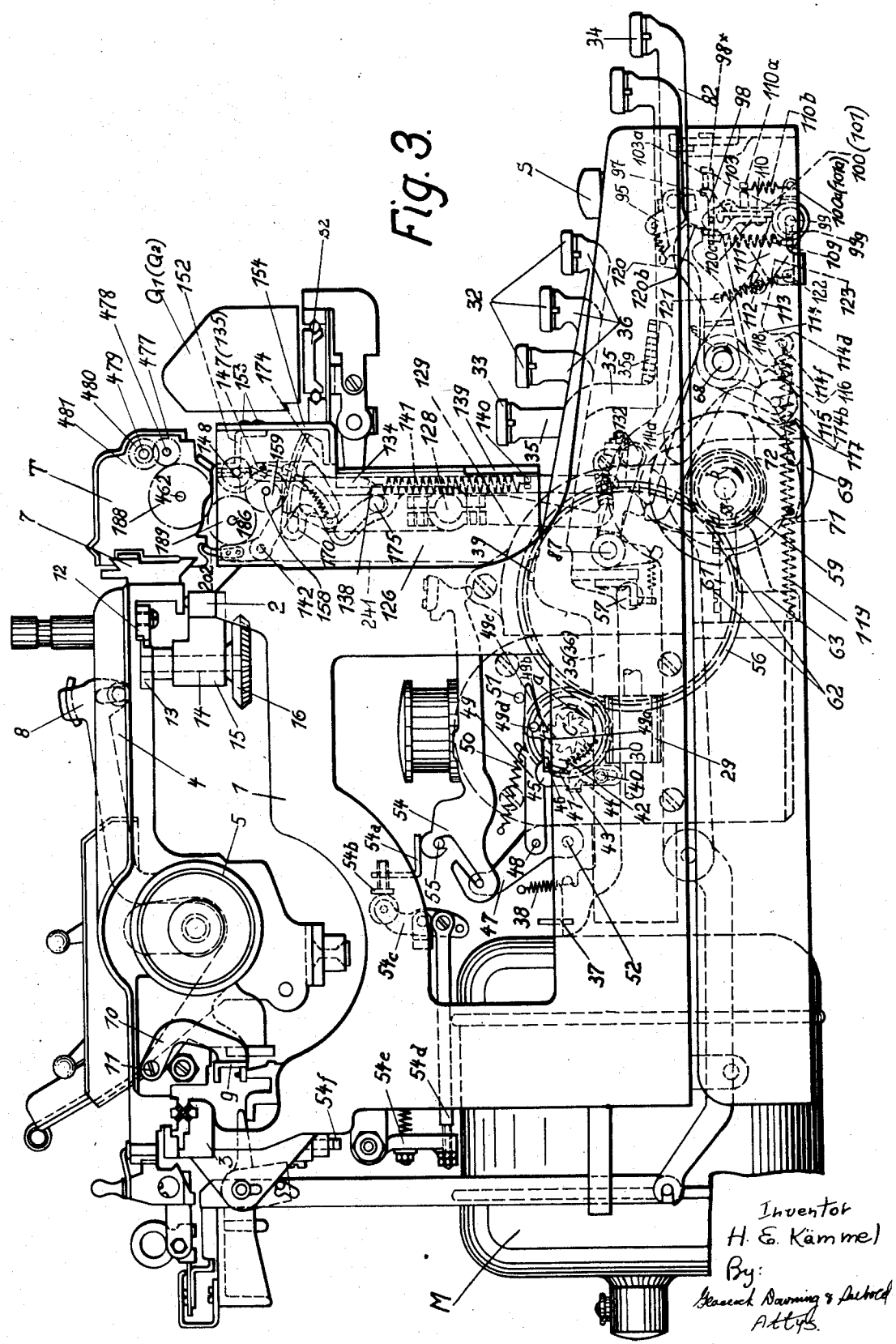
Figure 3 shows a left-hand side elevation of the machine.
Figure 4:
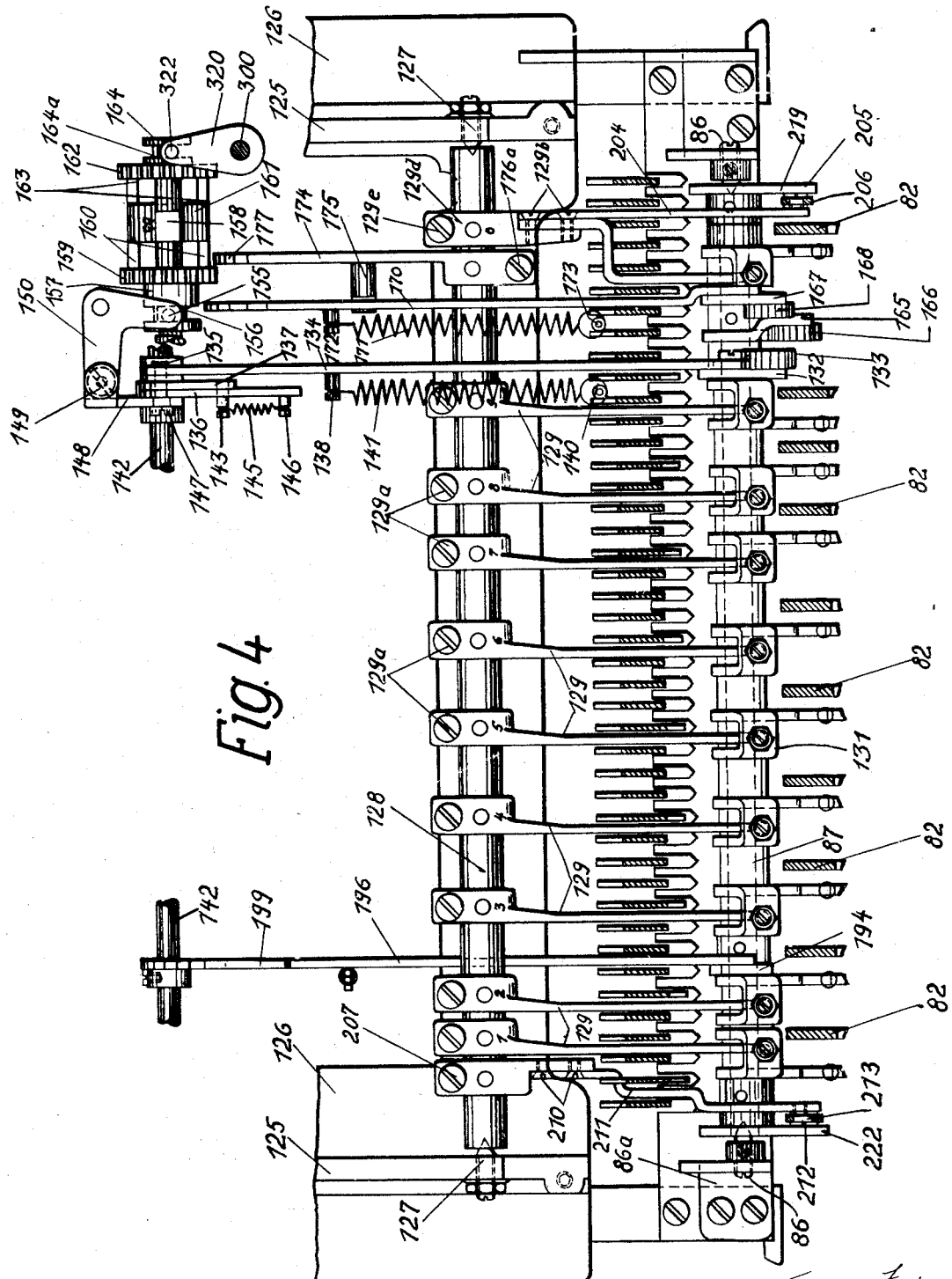
Figure 4 shows a front elevation of the calculating members together with the calculating segment and a part of the change-over or state control gear for the cross totalizers. The number typing keys and the letter typing keys are represented in section.

To the lever 136, a connecting member 148, is jointed by a screw 147 and this connecting member is jointed to one arm of an angle lever 150 (Figures 4, 8) by a screw 149. The lever 150 is swingably mounted by a screw 151, on a bracket 152, fixed by screws 153 (Figure 3) to the front wall 154 of the casing 125, 126. To the remaining arm of the angle lever 150 (Figure 8) is fixed a pin 155, which projects into a ring groove 156, of a sleeve 157, which is axially displaceable on a shaft 158, mounted in any suitable manner in the two side walls 125, of the casing 126. With the sleeve 157, a wheel 159, likewise mounted so as to be axially displaceable on the shaft 158, is in fixed connection. Pins 160 (Figure 4) are arranged on the toothed wheel 159, and these pins are always in engagement with a claw 161 (Figures 4 and 8) rigidly mounted on the shaft 158. Further, adjacent the opposite face of the claw 161 on the shaft 158, is arranged a toothed wheel 162, the pins 163 of which are likewise in engagement with the claw 161 (Figures 4, 8, 13).

The toothed wheel 162, is rigidly connected to a ring grooved sleeve 164 (Figure 4) arranged so as to be axially displaceable on the shaft 158.

*Printer control*

On the shaft 87 (Figures 4, 6 and 8) there is rigidly mounted a lever 165, on the free downwardly projecting end (Figure 6) of which a roller 166, is arranged, and this roller is capable of co-acting with the cam 71, hereinbefore described. The lever 165, is, moreover, fixed on the shaft 87, in such a manner that its roller 166, is normally in contact with the cam 71.

*Differential control*

Besides, on the shaft 87 (Figures 4, 6, 8), a lever 167, is arranged, so as to be loosely rotatable thereon. To the lever 167, a roller 168, is attached, so as to be rotatable, and this roller is capable of co-acting with the cam 72, hereinbefore described, in a manner to be hereinafter described in detail. To the lever 167, a slide 170, is jointed by means of a headed screw 169. By means of a spring 171, which is connected to a pin 172, arranged on the slide 170 and to a pin 173 (Figure 4) arranged on the front side of the calculating casing, the slide 170, is always acted upon downwards in the arrow direction a, whereby the roller 168 of the lever 167, is always held in contact with the cam 72.

The slide 170 is provided with an elongated angular slot 173x, formed as shown in Figure 8, into which projects a roller 175 mounted on the calculating sector 174. The calculating sector 174 is arranged so as to be capable of adjustment and of being fixed in position on the shaft 128, by a screw 176a. The upwardly directed part of the calculating sector 174, is provided with teeth 177, with which the main driving wheel 159, hereinbefore described, is capable of being moved into engagement.

The toothed sector 174 (Figures 3, 4, 8) which is actuated on depression of the total key 226a', in a manner to be hereinafter described, transmits the swinging movement corresponding to the value to be cleared, by way of the toothed wheel 159, and shaft 158, to a locking wheel 178 (Figure 8) rigidly mounted on the shaft 158, which locking wheel is always in engagement with a guide and locking tooth 179 fast on the locking shaft 142.

*Differential transmission for column totalizers*

Further, on the shaft 158, a toothed wheel 180 is journaled so as to be capable of axial displacement. This is normally in engagement with a toothed intermediate wheel 181, integrally formed with a hollow shaft 182, and a toothed wheel 183. The unit 181, 182 and 183 is rotatably mounted on a shaft 184, fixed in the left-hand wall 125 (Figure 4) of the calculating casing. The toothed wheel 183, is in engagement with a toothed wheel 185, rigidly mounted on a shaft 186 rotatably mounted in the left-hand side wall 125 of the calculating casing and in a bearing member (not illustrated) arranged approximately at the centre.

Besides the toothed wheel 185, there is a further toothed wheel 187, mounted so as to be non-rotatable on the shaft 186. Further, on the shaft 186, a master wheel 189 (Figure 8) is rigidly mounted, with which the toothed wheels 188 (Figure 3) of the column totalizers T, successively mesh as they are fed axially to the working position.

*Total key state control for column totalizers*

On the wheel 180, a ring grooved sleeve 190 is rigidly mounted, into which projects a pin 191, of a lever 193, rigidly mounted on the shaft 192, which is rotatably mounted in the calculating casing. The driving of the toothed wheel 180 (Figures 8 and 1) on a rotational movement of the shaft 158, is effected by a coupling disc 180a pinned to the shaft 158, releasably engageable by claws 180b, rigidly connected with the toothed wheel 180.

*Printer lock*

On the shaft 87 (Figures 3 and 8) there is rigidly mounted a lever 194, to the free upwardly directed end of which, a draw-bar 196, is pivoted at 195. A nose 197, of the draw-bar 196, engages over a nose 198, of a lever 199, rigidly mounted on the locking shaft 142. By means of a spring 200, connected to the draw-bar 196, and anchored to the calculating casing in any suitable manner, the lever 196 is normally swung about the pivot 195, in the anti-clockwise direction, so that its nose 197, engages the nose 198, of the lever 199. The lever 196 rests against a pin 201, arranged in any suitable manner, in the calculating casing.

*Combined release for individual numeral wheel trains of the column totalizers and differential transmission lock.*

On the locking shaft 142 (Figures 3, 8), there is fixed a release finger 202 capable of acting on each of the locking levers 461, arranged in each of the totalizers T1, to T8 in a manner to be hereinafter described. Further, on the locking shaft 142 there is a locking tooth 203, rigidly mounted, which is capable of co-acting with the main driving wheel 189, rigidly mounted on the shaft 186.

*Printing key selecting mechanism*

On the clamp 129d, (Figures 4 and 8), fast on the shaft 128 to the right of the calculating sector 174, a leg 204 is mounted by means of screws 129b, and to the free downwardly projecting part of the leg 204, which is bent rearwardly, a member 205 is jointed by means of a screw 205. On the left-hand side of the machine, a clamp 208, is arranged, so as to be capable of adjustment and to be clamped in position by means of a screw 207. To the projection 209 of the clamp 208, a part 211, correspondingly formed to that in Figure 8 is fixed by means of screws 210, and to the free downwardly projecting end of the part 211, there is attached a part 213, by means of a screw 212. A bar 216, correspondingly formed to that in Figure 8, is fixed to the part 213, by means of screws 214, and to the part 206, located at the right hand side of the machine by means of screws 215, so that a frame consisting of the parts 208, 211, 213, 216, 206, 204 and 129d, is formed.

The part 206 (Figure 8) located on the right-hand side of the machine, moreover, is guided by means of a headed screw 217, which projects through an elongated slot 218 in a lever 219, rigidly mounted on the shaft 87, and the part 213, arranged on the left-hand side of the machine of the frame, is guided by means of a headed screw 220, which projects through an elongated slot 221, in a lever 222, rigidly mounted on the shaft 87, so that the bail 213, 216, 206, is prevented from swinging downwardly round the screws 212 and 205. With the arm 223 of the lever 222, and with the arm 224 of the lever 219, engage springs, 225, one spring with each arm, which springs are connected at their free ends in any suitable manner in the machine housing, and these springs act upon the levers 222 and 219, and consequently upon the bail 213, 216, 206 in the clockwise direction. The swinging movement in the clockwise direction, however, is normally prevented by the draw-bar 196, the nose 197 of which engages over the nose 198 of the lever 199. The cross bar 216 of the bail 213, 216, 206, in a manner to be described later, is capable of co-acting with the noses 35g formed on the downwardly and forwardly extending number key levers 35 (Figure 3). Moreover the noses 35g are arranged on horizontal extensions 35h of different lengths, the lengths of these extensions corresponding to the numeral key values "0" to "9," the horizontal extension 35h corresponding to the value "0" (Figure 3) being the shortest and the horizontal part corresponding to the value "9" being the longest.

*Column register total key*

On the left-hand side of the machine is arranged the total key 226a' indicated by TV (Figures 2 and 10) for taking the totals of the column totalizers T. The key 226a' is attached to the key lever 226 as described, which is swingably mounted on the fulcrum rod 68. The wide projection 226a above described, of the total key lever 226 is capable of acting on the latching bar 97, 98 in the manner to be later described. The nose 226b of the key lever 226 is capable of co-acting with the nose 110g of the key locking bar 110. The rearwardly and somewhat upwardly projecting arm 226d of the total key lever 226, is capable of acting with its somewhat arched face 226c on the somewhat arched face 227 of an arm 228 of a lever 229. The lever 229 is pivoted at 230 on a supporting bracket 232, mounted by screws 231, in suitable manner on the machine housing. To the free rearwardly directed arm 233, of the lever 229, a link 235, formed as in Figure 10, is jointed by a screw 234, which link is provided with an elongated slot 236, in its free upwardly directed end. Through this slot a screw 237 projects, which is screwed into an arm 238, fixed on the shaft 192, whereby the link 235 is held loosely in connection with the arm 238. The link 235, is connected, in the manner illustrated in Figure 10, with a three-armed lever 239, swingably mounted in a suitable manner at 239x on the rear wall of the calculating casing 126. With the arm 239a of the three-armed lever 239, a spring 240 engages, which at its other end is connected to a pin mounted in the calculating casing, but not illustrated. In consequence of the action of the spring, 240, the link 235 is acted on in the direction of the arrow b, whereby its normal position is determined by striking of the key lever 226 against a stop 226s arranged on the machine housing.

On the shaft 192, Figure 10, mounted in the front wall 154 and in the back 241 (Figure 3) of the calculating casing 126, the swingable clutch-shifting arm 193 (Figure 10) already described, is rigidly mounted, and is rigidly connected by a sleeve 242, with the arm 243, likewise swingable with the shaft 192. The arm 243 is connected by means of a pin 244, with the arm 245, rotatably mounted on the shaft 192. The pin 244 is embraced by a fork-shaped end of a clutch control pitman 246 (Figure 10). With the pin 244 a spring 248 engages, which spring is connected to the pin 247, mounted on the clutch control pitman 246, whereby the latter is acted on towards the left and the arms 245, 243 towards the right, so that the same are always held in contact with the clutch control pitman 246.

To the upwardly directed arm 239b (Figure 10) of the three-armed lever 239, an extension 250 is fixed by screws 249, the angle 251 of the extension 250 being somewhat inclined. The extension 250 is capable of co-acting with the foot 252 of a locking and aligning tooth 253 (Figures 10, 11, and 12) of U-shape.

An elongated hole 254 is provided in each of the limbs 252 and 253a, of the U-shaped locking and aligning tooth, and through these holes projects the shaft 186 already described. Into the arcuate slot 255, formed in the foot 252 of the locking and aligning tooth 253, as in Figure 10, there projects a pin 257, rigidly mounted on the lever 256. The lever 256 (Figures 10, 11, 12 and 15) is rigidly mounted on the locking shaft 142, hereinbefore described.

A spring 258 (Figures 10, 11 and 12) engages with a lug 259, of the locking and aligning tooth 253 and is connected to the lever 256. The locking and aligning tooth 253 is positioned in its normal position with the edge 254a of its elongated hole 254, resting against the shaft 186 and the edge 255a of the arcuate slot 255, against the pin 257 of the lever 256. On the bridge connecting the two limbs 252 and 253a of the locking and aligning tooth 253, a tooth-like projection 260, is formed, capable of engaging in the tooth spaces of the toothed wheels 188, arranged in and forming parts of the denominational trains of the column totalizers.

Carriage-control of add-subtract state for column totalizers

A control pitman 298 for the control of addition or subtraction is jointed at its right hand end to a lever 299 (Figure 13) rigidly mounted on a shaft 300, mounted in bearings in the front wall 154, and in the rear wall 241, of the calculating casing 126.

On the supporting rail 7 (Figures 1 to 3) of the paper carriage 4, as already stated, the column totalizers T are removably mounted. On the column totalizers T, pre-setting plates 301 (Figures 1 and 13) are mounted by means of which the control of the type of calculation of the associated column totalizer located in the working position is effected for addition or subtraction. The pre-setting plate 301 of one of the column totalizers (Fig. 1), which is directly in the working position, acts on a stud 302 (Figure 13) of an angle lever 303, pivoted at 304, on the front wall 154, of the calculating casing 126. By means of a spring 307, which engages with the lever 303, and is connected to a pin 306, fixed in the front wall 154 of the calculating casing 126, the angle lever 303 and the state control pitman 298, are held in their normal positions illustrated in Figure 13, the normal position being determined by a stop pin 308, arranged in the front wall 154 of the calculating casing. The angle lever 303, is of fork-shape at its lower end and embraces a pin 309, of a reversing lever 311, swingably mounted, by a screw 310 on the front wall 154 of the calculating casing 126. While the pin 309 is capable of co-acting with the V-shaped recess 312 at the free end of the control pitman 298, the pin 313, fixed to the reversing lever 311, co-acts with the upwardly directed V-shaped recess 298a, but the pin 313, is no way connected with the angle lever 303.

On the front wall 154, of the calculating casing 126, is arranged a knob 315 (Figures 1 and 2) which is capable of being set on "Add.", "Subtr." or "Disc." corresponding, respectively with "Addition", "Subtraction" and "Disconnected" and this knob is rigidly connected to the lever 316 by a stud shaft 315a (Figure 10). On the control member 316, pins 317, 318 are arranged, which co-act with the control lever 246 in detail.

Further, on the shaft 300 (Figure 13) there is mounted a lever 320, rigidly connected to the lever 299, by a sleeve 321 (Figure 13). A pin 322, on the lever 320, engages in a ring groove 164a (Figure 4) of a sleeve 164, rigidly mounted on the toothed wheel 162. The toothed wheel 162, if the cross totalizers Q1 and Q2 operate in the additive sense, is in engagement with the toothed wheel 324 (Figure 14) rigidly mounted on the shaft 323, which is rotatably mounted in the calculating casing 126. Further, on the shaft 323, there is arranged a toothed wheel 325, in fixed relation to the toothed wheel 324, by a sleeve 326. The toothed wheel 325 is in engagement with an intermediate wheel 328 rotatably mounted on the pin 327 rigidly mounted on the right-hand side wall 125, of the calculating casing 126. As will be evident from Figure 14, the toothed wheel 162, can be moved sometimes into engagement with the toothed wheel 324 and at other times with the intermediate wheel 328.

Cross totalizer key control of add-subtract mechanism

On the right-hand side of the machine, the key 329, for taking totals of the cross totalizers Q1 and Q2, is arranged. The crossfooter total taking key 329, is attached to the key lever 330 (Figures 13 and 17) swingably mounted on the fulcrum rod 68, the key lever being correspondingly formed as shown in Figure 13. The nose 330a, of the key lever 330 is capable, in a manner to be later described, of co-acting with the nose 110g of the member 110, and the projection 330b of the key lever 330 is capable of co-acting with the latch bar 98. The rearwardly directed part of the key lever 330, is somewhat arched at 331, on its upwardly directed edge. This arched face 331, is capable of co-acting with an arched face 332, of a slide 337, vertically displaceable by means of the screw-slot connections 333, 334 and 335, 336, arranged in suitable manner on the right-hand side of the machine and the front wall of the housing. With the projection 337a, engages a spring 338, which, on the other hand, is connected to a pin 339 (Figures 13, 17). To the upwardly-directed end. formed as shown in Figure 13, of the slide 337 there is riveted a pin 340, which projects into a curved slot 341 of a slide 342. The slide 342 is displaceably mounted by screws 343, which pass through the elongated holes 344 of the slide 342. The left hand end of the slide 342 is of fork-shaped construction. With this fork-shaped part, there engages the pin 346 of a lever 345, rigidly mounted on the shaft 300. Another lever 347, rigidly mounted on the shaft 300, has likewise a pin (not illustrated) capable of projecting into the ring groove 164a (Figures 4 and 8) already referred to, of the sleeve 164.

On the slide 342 (Figure 13) there is a bent-off lug 348 (Figures 13 and 17) capable of being positioned so that the face 349 of its nose 350, lies in front of the face 351 of a locking or aligning detent 352. On the detent shaft 353 which at one end is rotatably mounted in the right-hand side wall 125 of the calculating casing and at the opposite end in a bearing member (not illustrated) suitably mounted in the machine housing, a locking lever 354 (Figures 13 and 16) is rigidly mounted. The locking and aligning detent 352, as is evident from Figures 13 and 16, is fork-shaped at its forwardly directed end and its fork-shaped part embraces a sleeve 363a (Figure 16) loosely rotatable on the shaft 323, whereby the locking and aligning detent 352 is guided at one of its ends. At its other end, it is guided by means of a screw 355, fixed to the locking lever 354, and the screw projects through an elongated hole 352a (Figure 17) in the locking or aligning detent 352. By means of a spring 356, which engages with a pin 357, fixed to the locking lever 354 and is connected to a pin 358 (Figure 17) arranged on the locking or aligning detent 352, the parts 352 and 354 are so acted upon that the stem of the screw 355 is moved against the right-hand edge of the elongated hole 352a in the locking and aligning detent 352, whereby their normal position in relation to each other is determined. On the locking and aligning detent 352 is arranged a tooth-like part 359 (Figures 13 and 17) which, in a manner to be hereinafter described in detail, is capable of co-acting with the toothed wheels 360, arranged on the left-hand cross totalizer Q1. A nose 361 (Figures 15 and 17) provided on the locking lever 354, is normally in engagement with the master wheel 362 (Figure 13) loosely rotatable on the shaft 323. With the master wheel 362 and the sleeve 362a (Figure 16) a coupling member (Figure 16) is rigidly connected.

A lug 364, correspondingly formed as shown in Figure 13, on the slide bar 342, is capable of co-acting, by means of a face, 365 (Figure 13), with a face 366 of a locking and aligning detent 367. This is fork-shaped at its forwardly directed end and embraces a sleeve 367g (Figure 16) arranged so as to be loosely rotatable on the shaft 323. By means of a screw 369x which projects into the elongated hole 368 (Figure 16) of the locking and aligning detent 367, and which is screwed into the lever 369, rigidly mounted on the detent shaft 353, the locking and aligning detent 367, is guided. This is of tooth-like construction at its forked end 370, and this tooth is capable of co-acting with the toothed wheels (not illustrated), arranged in the cross totalizer Q2. The tooth 371 of the locking lever 369 (Figure 16), is in engagement with the teeth of the master wheel 372, which is loosely rotatable on the shaft, 323. By means of a spring 373x which engages with a pin 373, arranged on the lever 369 and is connected to a pin 367a (Figures 13 and 16) fixed to the locking and aligning detent 367, the detent 367 and locking lever 369 are so acted upon that the stem of the screw 369x, which is screwed into the locking lever 369, lies against the edge 374 of the elongated hole 368, of the locking and aligning detent 367, whereby its rest position is determined.

*Carriage-controlled cross totalizer selection*

With the master wheel 372, the sleeve 367g (Figure 16) is in fixed relation. To the sleeve 367g, a coupling member 375 (Figure 16) is fixed. As will be evident from the above, the sleeve 363a, the master wheel 362, the sleeve 362a and the coupling member 363, are connected with one another and are loosely rotatable on the shaft 323, but are not axially displaceable thereon. The same holds for the parts 375, 367g and 372.

Further, on the shaft 323, a driving coupling sleeve, 378, consisting of the two driving coupling members 376 and 377, is axially displaceable and rotates along with the shaft 323. With this arrangement, the coupling member 376 is capable of moving into engagement sometimes with the coupling member 363 and at other times the coupling member 377 is capable of moving into engagement with the coupling member 375, and finally, in the middle position of the coupling sleeve 378, both of the coupling members 376 and 377 simultaneously engage with the coupling members 363 and 375, so that alternatively one or other of the totalizers Q1 or Q2, and finally both these totalizers can be operated at the same time.

In the ring groove 378g of the driving coupling sleeve 378, there engages a pin 378h (Figure 16), fixed to one arm of the angle lever 378k swingably mounted at 378m, on a lug of the rear wall 241 (Fig. 3) of the calculating casing. By means of a screw 378n, a connecting rod 378p is jointed to lever 378k, which connecting rod 378p is in articulated connection with an angle lever 378s, swingably mounted at 87g on the front wall of the calculating casing. The lever 378s is capable of co-acting by its right-angled upwardly-bent nose 378t with a cam bar 378y attached to the column totalizer T, by screws 378x. (In Figure 16, only one is visible.)

On the detent shaft 353 (Figure 15) a lever 378a is rigidly mounted, one arm 379, of which is embraced by a socket 380 formed in one arm of an elbow lever 381, swingably mounted on the locking shaft 142. With the nose 378b of the lever 378a, a spring 378c, engages, which acts on the detent shaft 353 in the clockwise direction and thus holds the detents 354 and 369 (Figure 16) in engagement with the master wheels 362 and 372. The lever, 381 (Figure 15), is arranged on the outside of the right-hand side wall 125 of the calculating casing. This lever is constructed with a recess in its upper end 382 which accommodates the laterally bent nose 383 of a lever 384, rigidly mounted on the locking shaft 142. The lever 384, moreover, is arranged at the left of the right-hand side wall 125 of the calculating casing.

On the right-hand side of the machine and on the inner side of the front wall 139 (Figures 3 and 22), a slide 391, is adjustably displaceable to the right and left by a setting knob 392, and a sliding screw 393. The slide 391, is capable of acting by means of its edge 394 on a slide 396, displaceably mounted at 395, in the calculating casing 126. To the right-angled upwardly-bent part 397 of the slide 396, an angle lever 399, is jointed at 398. This angle lever 399, is swingably mounted at 400, on the rear wall 241 (Figure 3) of the calculating casing 126. By means of a screw 401, a link 402, formed as shown in Figure 22, is jointed to the remaining limb of the angle lever 399. The link 402 has its downwardly-directed end of fork-shape, and its fork-shaped part 403, embraces a pin 404, fixed to a case shift key lever 406. The key lever 406, is rigidly mounted on a shaft 407, rotatably mounted in bearing members 408, fixed to the machine housing in any suitable manner. (In Figure 22 the bearing member 408 located on the left-hand side of the machine only is illustrated.) The forwardly-directed end of the lever 406 carries the case shift key 409 provided with the symbol "SK."

The slide 391 (Figure 22) is bent at right angles and is provided with an inclined face 410. By means of this face, the slide 391 is capable of acting on a slide 411. The slide 411 is displaceably mounted on the slide 170, on the one hand, by a screw 412, which passes through an elongated hole 413 in the slide 411 and which is screwed into the slide 170 above described and, by a pin 414, fixed to the slide 411, which projects through an elongated hole 415 (Figure 8) of the slide 170. By means of a spring 416, which engages with a pin 414 and is connected to a pin 417, fixed to the slide 170, the slide 411 is held in the position illustrated in Figure 22. On the locking shaft 142 is rigidly mounted a locking lever 418, which is capable of co-acting with the slide 411. Normally, the locking lever 418 takes up the inoperative position illustrated in Figure 22, in relation to the slide 411.

On the detent shaft 353, already described, the release fingers 353b (Figures 15 and 22) for the cross totalizer Q1, and the release fingers 353a, for the cross totalizer Q2, are rigidly mounted. Further, on the detent shaft 353, is rigidly mounted the arm 419, to which is riveted by two rivets 420, a bar 421, having its downwardly directed end of fork-shape. The bar 421, embraces a pin 423, mounted on the angle lever 422. The angle lever 422 is swingably mounted on a post 423a, fixed in any suitable manner to the machine housing, and a pin 424 arranged on the angle lever 422 is positioned on the upper edge 425 of the known back space key lever 426, and is capable of co-acting with this in a manner to be hereinafter described. This key lever 426 carries the key 427 at its forwardly-directed end, the key being provided with the indication "B. S." The lever 426 is swingably mounted on the screw 428, on the machine housing. By means of a spring 429 which engages with the key lever 426 and is connected to a pin (not illustrated) fixed to the machine housing, the key lever 426 is acted upon round the screw 428 in the anti-clockwise direction, whereby its rest position is determined by striking against a screw 426x.

To the key lever 426 is jointed a draw-bar 431, at 430 in Figure 22. The free upwardly-directed end of the draw-bar 431 is jointed at 432, to a yoke 433. This is swingably mounted at 434 on the bearing member 435 rigidly mounted on the machine housing at 436. A link 439 is jointed to the downwardly-directed limb 438 of the yoke 433, at 437. On the link 439, a pawl support 440 is adjustably mounted by screws 441. To this end, the screws 441, pass through elongated holes 441x in the pawl support 440 and are screwed into the link 439. On the pawl support 440, there is swingably mounted at 442, a pawl 443, capable of co-acting by its tooth 444 with the ratchet wheel 445, and by its own weight is normally positioned with the edge 446 of its elongated slot 447 resting on a pin 448, fixed to the pawl support 440. The part 440 is guided by a screw 450, which is screwed into the machine housing, and passes through the elongated hole 449, of the pawl support 440. The ratchet wheel 445, is rigidly mounted on a shaft 451, mounted in bearings in the machine housing. On the shaft 451, further, a toothed wheel 452, is fixed, which is in engagement with the rack 453 arranged on the paper carriage.

*Totalizer structure*

The individual parts of a totalizer will now be described in detail.

On a shaft 456 (Figure 18) rigidly mounted in the two side walls 454 and 455 (Figures 18 and 20) of a column totalizer T, a detent lever 457 is swingably mounted in the lowest decimal place, and is formed with its lower end of fork-shape. The release lever 202 (Figure 8) hereinbefore described, is capable of engaging in the fork-shaped part 458, to disable the lever 457. With the detent lever 457 there engages a spring 459, which is connected to a shaft 460 mounted in the two side walls 454 and 455 of the column totalizer T. The spring 459 acts on the detent lever 457 in the clockwise direction round the shaft 456, whereby its normal position is determined by the tooth 461 of the detent lever 457 being in engagement with the 30 toothed wheel 188 Ht rotatably mounted on the shaft 462.

With the toothed wheel 188 Ht (Figures 18, 20 and 21) of the lowest decimal place, a carry-tripping disc 465 provided with three tens-shift teeth 464 and a carry-locking disc 466, are rigidly connected. The three parts 188 Ht, 465 and 466, are produced from a single piece and consequently represent a single element. The nose 467 provided on the upwardly-directed free end of the detent lever 457 (Figure 18) is capable of acting on a flap 468 rockably mounted in the two side walls 454 and 455 of the column totalizer.

To the right of the detent lever 457 (as seen in Figure 18) there is a lever 469 swingably mounted on the shaft 456. The downwardly directed limb 470 of the lever 469, is of fork-shape, and is capable of co-acting likewise with the release finger 202 above mentioned. The nose 471, of the lever 469, co-acts likewise with the flap 468. On the lever 469, a three-part transfer wheel 473, 474, 475 is rotatably mounted by a headed rivet 472 (Figures 18, 20 and 21), the transfer wheel consisting of a ten-toothed wheel 473, a ten-toothed Maltese wheel 474 and a ten-tooth toothed wheel 475, produced from a single piece, of which the toothed wheel 473, is capable of co-acting with the three-toothed tens-shift disc 465, and the Maltese wheel 474, with the locking disc 466. The disc 466 is provided with three notches 476, for the free passage of the teeth of the Maltese wheel. The wheel 475 meshes with the accumulator wheel 188 Zt of next higher order.

The toothed wheel 188 Ht is, further, in engagement with a toothed wheel 477 (Figures 17, 18, 20 and 21) loosely rotatable on a shaft 478, rigidly mounted in the two side walls 454 and 455 of the column totalizer T. The toothed wheel 477 is in engagement with the toothed wheel 480, loosely rotatable on the shaft 479, which is rigidly mounted in the two side walls 454 and 455, of the column totalizer. A number roller 481 is rigidly connected with the toothed wheel 480. The toothed wheel 475, associated with the lowest decimal place or the hundredths decimal place, is in engagement with the wheel 188 Zt of the tenths decimal place. The parts above described for the hundredths decimal place are similar for the tenths, units, tens, etc. decimal places. In the following, therefore, only the differences will be pointed out.

By means of a detent lever 482 (Figures 18 and 19) swingably mounted on the shaft 456, of which lever the nose 483 (Figure 19) acts on a part 484, arranged on the flap 468, the flap 468 is held swung in the anti-clockwise direction (seen in Figure 18), whereby its rest position is determined by contact of the noses 467 of the levers 457, 469 on the one hand, and, on the other hand, by contact of the nose 461 of the lever 457 in the tooth spaces of the toothed wheel 188. The lever 482, moreover, is held swung in the clockwise direction (seen in Figure 18) by means of a spring (not illustrated) which engages with the hole 485, of the lever 482. Since in the pointing off-place of the column totalizer, which is in working position, no transfer into this column totalizer is permitted to take place, the locking shaft 142 (Figure 8) and the parts located on it are prevented from being unlocked by the release finger 202, which when the pointing off-place of the column totalizer is opposite the master wheel 189, co-acts with the part S (Fig. 18) swingably mounted on the shaft 456 of the column totalizer T, in such a manner that the projection 487 of part S comes to lie against the shaft 488, fixed in the side walls 454, 455 of the totalizer T. Consequently from swinging outwardly the release finger 202 is prevented.

As is evident from Figure 20, the two wheels 188K, 465, 466 and 188E, 465, 466, are connected by rivets 489 to one another, so as to form a single element, in order to bridge over the comma place, or for transferring a ten from the tenth's decimal place 188 Zt into the units decimal place 188E. It must first be set forth that if the wheels 475 of the transfer wheels 473, 474 and 475 are in engagement with their associated driving wheels 188 a rotation of the last named wheels is not possible as long as the wheel 474 is engaged by a concentric part of the locking disc 466, as shown in Fig. 21. Therefore, if e. g. the Maltese wheel 474, located between the hundredth's decimal place 188 Ht and the tenth's place 188 Zt contacts with its locking disc 466, the wheel 188 Zt will not be permitted to rotate, since the form of the teeth of the Maltese wheel 474, which contact with the locking disc 466 (Figure 21) of the wheel 188 Ht, do not permit of rotation of the same. Accordingly, the wheel 475 which is rigidly connected to the Maltese wheel 474, and which is in engagement with the driving wheel 188 Zt, will not permit of a direct rotation of the wheel 188 Zt by the master wheel 189 (Figure 8). If, on the other hand, after the detent lever 461, 457 (Figure 18) has been raised by the locking finger 202, the driving wheel 188 Ht is acted on by the master wheel 189, so the wheel 188 Ht, as is readily perceived from Figure 21, may rotate without hindrance, as its locking disc 466 rotates past the teeth of the unmeshed stationary Maltese wheel 474. If, now, during the rotational movement of the wheel 188 Ht a tens shift tooth 464 (Figure 21) strikes against the toothed wheel 473 (Figure 20) rigidly connected with the Maltese wheel 474, the wheel 473, together with the Maltese wheel 474, rotate through one unit, since at this instant the tooth concerned of the Maltese wheel 474, passes through the space 476 (Figure 21) of the locking disc 466, of the wheel 188 Ht. Accordingly, as the carrying wheel 473, 474, 475 rotates through one unit, the wheel 188 Zt will be rotated thereby through one unit to shift the number roller of the tenth's decimal place by way of the wheels 477 and 480, through one unit.

If now, the wheel 188 Zt of the tenth's decimal place is to be rotated by the master wheel 189, the lever 469 (Figure 18) must be raised by the release finger 202. The transfer and locking wheel 473, 474, 475 located between the hundredth's decimal place and the tens place, moves out of engagement with its associated locking disc 466, and also with the wheel 188 Zt, so that the latter can be rotated by the main driving wheel 189 (Figure 8).

*Totalizer clearing operation*

In the automatic "clearing" of a column totalizer the procedure according to the invention is as follows:

The locking or aligning tooth 253, 260 (Figure 11) is locked in a tooth space, e. g. of the wheel 188Z (Figure 20), so that a rotation of the wheel 188Z is impossible.

Further the release finger 202 (Fig. 18), raises by way of the parts 469, 472 and 491, the transfer wheel 473, 474, 475 located between the wheels 188K and 188Zt, out of operative position, so that the wheel 188E, with which the master wheel 189 is now in engagement, can be rotated by the master wheel 189, although the wheel 188E is riveted to the wheel 188K. If the master wheel 189 now rotates in the subtractive sense, the wheel 188E, if its associated number roller, e. g. indicates a "7" will rotate backwards by way of "6"; "5" etc. It can do this until one of its tens shift teeth strikes against the wheel 473 of the transfer wheel which has not been raised, and which is located between the wheel 188E and the wheel 188Z. Since this transfer wheel, however, is in engagement by way of its wheel 475 with the wheel 188Z, and the wheel 188Z is locked by the aligning tooth 253, 260, the wheel 188E cannot rotate further, at which moment its associated number roller shows a "0." As soon as the clearing of the units place is effected, that is to say, as soon as the number roller 481 of the units place indicator "0" and this mark is printed on the sheet, a carriage movement is effected automatically, the totalizer with the decimal place moving into working position. In this position of the totalizer, the clearing key is now depressed whereupon the totalizer with its tens place moves into working position.

If now the tenth's decimal place is to be "cleared" so the aligning tooth 253, 260 (Figure 11) is in engagement with the wheel 188K, whereby the release finger 202 lifts and retains the transfer wheel located between the wheel 188Zt and the wheel 188Ht out of operative position while the main driving or master wheel 189 (Figure 8) is in engagement with the wheel 188Zt. Consequently the number roller 481 is (Figure 20) rotated to zero through the intermediary of the parts 477, 480 which position is determined by the fact that the wheel 180 Zt is held by the lock effected by the aligning tooth 253, 260 engaged with the wheel 188K, which prevents rotation of the wheel 188Zt past its zero position.

Since, further, as will be readily perceived from the foregoing, the decimal wheel which lies adjacent and next higher to the decimal wheel to be "cleared" must always be locked, a value located in the highest wheel of a totalizer cannot be cleared, in other words, precautions must be taken that in the highest wheel no value at all shall be registered.

This is attained in the following manner. As is obvious from Figure 18, on the locking lever 469a, which carries the transfer wheel disposed between the wheel 188H (Figure 20) and the wheel 188Z, a nose 492 (Figure 18) is provided which lies against the shaft 488. In this manner the locking lever, 469a, exactly as is the case with the locking member S for the comma place, is not allowed to be swung by the release finger 202 (Figure 8), so that a registration of a value, therefore, on the wheel 188H, is not possible. In order to render visible from the outside (through the inspection aperture of the totalizer) that this decimal place is not a calculating place, a blank roller 493 (Figure 20) is inserted which shows a black spot in the position in which the remaining number rollers show a "0," while the remaining periphery of the blank roller is red. This has for its purpose, that if from the number roller of the tens decimal place 188Z a tens transfer in the additive or subtractive sense should occur on to the roller 493 (which is possible after what has been said above with reference to tens transfer) the attention of the operator is called to the fact that he has overstepped the capacity of the totalizer.

*Operation of the machine –Totals of cross totalizers*

The method of operation of the subject of the invention will now be explained by the aid of an example of a calculation.

Assume that entries have been made in the columns 1 to 9 of the formular according to Figures 23 and 24 in the manner described in U. S. Patent No. 2,236,642. Further, assume that the amount "184.30," which is visible in the cross totalizer Q1 (Figure 1) and the amount "4.30," which is visible in the cross totalizer Q2 are to be withdrawn, from the same and transmitted to the column totalizers T7 and T8, respectively.

In order to withdraw these amounts from the cross totalizers Q1 and Q2, and register them automatically in the column totalizers T7 and T8, it is necessary first to depress the tabulator key 93 of the hundreds decimal place (Figure 2) in order to bring the hundred decimal place of the column totalizer T7 into the working position, whereby the cross totalizers Q1 and Q2 are also moved by coupling device s1 and s2 (Figure 1), so that their hundreds decimal places also are brought into the working position.

As soon as the column totalizer T7 arrives in the working position, the state control cam 301 (Figure 13) of the column totalizer T7 which has been set to subtraction, acts on the nose 302 of the angle lever 303, and swings the same round the screw 304 in the clockwise direction, against the action of the spring 307.

In this movement, the fork-shaped part of the lever 303, acts on the pin 309 riveted to the part 311, whereby the same is swung in the clockwise direction. Since the pin 309 is in engagement with the recess 312 of the state control bar 298, the latter is displaced in the direction of the arrow r, indicated in Figure 13. In consequence of this, the lever 299, the shaft 300, the lever 320 and the lever 347 are swung in the anti-clockwise direction (Figure 4). Since the pin 322 of the lever 320 and the pin (not illustrated) of the lever 347 engage in the ring groove of the sleeve 164 of the toothed wheel 162, the toothed wheel 162 is displaced to the left on the shaft 158 and in this manner is disengaged from the toothed wheel 324 (Figure 14) and is engaged with the intermediate wheel 328 which, also is in engagement with the toothed wheel 325, which is not rotatable on the shaft 323. In this manner the direction of rotation of the master wheel 362 (for the cross totalizer Q1) has been reversed. In regard to this it may be remarked that the cam 378y (Figure 16) is so arranged on the column totalizer T7 that the cam 378y on the entrance of the column totalizer into the working position, is not in position to rock the lever 378t, 378s. Therefore, the sleeve 378 remains in its position, illustrated in Figure 16, in which the teeth 377 of the sleeve 378 are out of engagement with the teeth 375 of the master wheel 372 of the cross totalizer Q2, while the teeth 376 of the sleeve 378, are in engagement with the teeth 363 of the master wheel 362 for the cross totalizer Q1. Consequently, on the operation of the machine the number rollers of the cross totalizer Q1, are rotated in the negative sense, while the number rollers of the cross totalizer Q2, are not acted upon. The column totalizer T7 remains set for additive operation. As the column totalizer T7 arrives in the working position, however, the cam 87t (Figure 9) fixed to the same, has come into operation on the nose 87s' of the lever 87s whereby the nose 87s" of the lever 87s has released the lever 87u, and further the remaining parts in connection with the lever 87s have also taken up the positions according to Figure 9, so that the lever 87a of the shaft 87 and the hook 98" of the latch bar 98, are released by the locking lever 87d, and can move freely.

Now, the key 329 (Figures 2 and 13) for total-taking (TC) of the cross totalizer is depressed. With this operation the face 330b of the lever 330 acts on the nose 97 of the latch bar 98 and swings this in the clockwise direction against the action of the spring 109 (Figure 6). In this movement the lug 98x (Figure 6) of the latch bar 98, slides from the edge 103g of the bearing member 103, which is formed as a stop whereby the levers 100, 101, 111, rigidly mounted on the shaft 99 and the lever 114 mounted on the fulcrum rod 68 follow the pull of the spring 115, which engages with the three armed lever 114.

By the resulting swinging movement of the lever 114 in the clockwise direction the pawl 74 snaps under the action of the spring 72a in engagement with the wheel 73, whereby the cams 72, 71, 69 participate in the rotation of the shaft 58 in the arrow direction b. The depressed key 329 (T. C.) for taking totals of the cross totalizers Q1 and Q2 is held automatically for such time in the depressed position in the manner hereinafter described, until the cross totalizer Q1 is cleared, and the pawl 74 remains in engagement with the wheel 73 also for this period.

After the shaft 58 and with it the cams 72, 71, 69 have commenced to rotate in the arrow direction b, the cam 72 acts first on the arm 114b of the lever 114 and swings the same against the action of its spring 115 and in the opposite direction of the arrow m, whereby the parts 111, 99, 100, 101 and latch bar 98 are swung in the clockwise direction, while the key locking bar 110 at this point is still held swung-out in its anti-clockwise position by the engagement of the recess 120d of the lever 120 with the lug 120c. In the swinging of the latch bar 98 in the clockwise direction, however, its nose 97 (Figure 13) slides along on the projection 330b of the lever 330 of the cross total key 329 (T. C.), whereby the lug 98x (Figure 6) of the latch bar 98 cannot engage with the stop 103a of the bearing member 103. Consequently, the parts 111, 100, 101, and the latch bar 98 (Figure 6) are not held at the end of their swinging movement in the clockwise direction but follow, on the further rotation of the cam 72, the action of the tensioned springs 115 and 110b so that the lever 114, therefore, is swung again in the arrow direction m and the parts 111, 100, 101, and 98 are swung in the anti-clockwise direction, whereby the tension of the springs 115 and 110b is diminished.

When, shortly before the end of the first revolution of the cams 72, 71, 69 i. e., shortly before the termination of the calculating operation in the hundreds denomination, the lever 120 by the co-operation of its arm 120a with the projection 69c of the cam 69 is swung round the fulcrum rod 68 against the action of the spring 123, the hook 120d and lug 120c are disengaged. Since, however, at this point the parts 111, 99, 100, 101 and 98 under the action of the spring 115 attached to the lever 114 are already swung again so far in the anti-clockwise direction that the pins 100b and 101b contact with the locking bar 110 and the latter is held up to this point in the locking position by the lever 120, therefore this bar 110 is held by the pins 100b and 101b until the nose 120b of the lever 120 snaps behind the lug 120c. Since, after the preceding movement, the parts 114, 111, 100, 99, 101 and 98 have been brought back again into the working position by means of the spring 115, so the nose 114x of the arm 114a of the lever 114 has again moved out of its effective position in relation to the nose 80 of the pawl 74, whereby the cam series 72, 71, 69 is not uncoupled after the resulting revolution of the same, but commences a further revolution and consequently a new calculating operation also, after a carriage step, as hereinafter described, takes place so that the cross totalizer Q1 is then located with its tens denomination in the calculating position.

This operation is repeated for each denomination of the cross totalizer Q1 so that, therefore, the key 329 (T. C.) in accordance with what has been said above, is held automatically depressed until the cross totalizer Q1 is cleared.

After having described the locking of the cross total key 329 (T. C.) in its depressed position, the further operations which are carried out on the depression of this key will be set forth.

The rear end 331, of the cross total key lever 330, moreover, now acts on the depression of the cross total key 329, on the lower end 332 of the slide 337, so that this slide moves upwards in the opposite direction of the arrow a (Figure 13) and against the action of its spring 338. With this, its pin 340, acts on the incline 341a of the slot 341 of the slide 342, whereby the slide 342 is displaced to the left (seen in Figure 13).

Now, should it have been forgotten by inadvertence to change over the cross totalizer Q1 for subtraction, because the pre-setting plate 301 of the column totalizer concerned, in this case T7, has not been set, this is not a disadvantage since, when the slide 342 moves to the left it acts on the pin 346 fixed to the lever 345, and rotates the lever 345, the shaft 300, the levers 347 and 320 in the anti-clockwise direction, so that the driving or crossfooter master wheel 362, by means of the change-over or reversing gears 162, 328, 325, the shaft 323, the sleeve 378 (Figure 16) and coupling members 376, 363, is changed over automatically for subtractive operation.

In the movement of the slide 342 (Figure 13) to the left, the nose 350 of the part 348 of the slide 342 moves in front of the face 351 of the aligning tooth 352 of the cross totalizer Q1, and the nose 365 of the lug 364 of the slide 342 moves in front of the face 366 of the aligning detent 367 of the cross totalizer Q2, so that the teeth 359 and 370 of the aligning detents are held in engagement with the toothed wheels 360 (Fig. 17) of the cross totalizers Q1 and Q2, lying to the left of the cross totalizer driving or master wheel 362 or 372, so that the toothed wheels thus engaged are locked. The wheels 360 of the cross totalizers Q1 and Q2 correspond, moreover, to the wheels 188 of the column totalizer.

In the rotation of the three cams 69 (Figure 6) 71, and 72, the roller 133 on lever 132, moves under the action of the spring 141 engaging with the draw bar 134, from the elevated part of the cam 69, to the lower part of the same, whereby the draw-bar 134 moves in the direction of the arrow a. Hereby, the toothed wheel 159 is brought into engagement with the teeth 177 of the calculating sector 174, by way of the loose segment lever 137 (Figure 8) stud 143, fast segment lever 136, connection 148, bell crank 150, pin 155 and sleeve 157. Further, on the displacement of the draw-bar 134 in the direction of the arrow a, the locking shaft 142, and the parts 199, 179, 203, 87u (Figure 9) 256 (Figure 10) 202, 418 (Figures 15 and 22) and 384 rigidly connected to it are swung by way of the parts 137, 143, 136 in the clockwise direction (seen in Figure 8) whereby by means of the release finger 202, the locking lever 469, (Figures 8 and 18) lying opposite to it, is raised and accordingly the calculating place located in the working position of the column totalizer T7 is unlocked.

In the swinging movement of the locking shaft 142 in the clockwise direction (Figure 15) the lever 384 fixed to it, is likewise swung in the same direction. As a result of this, the lever 384 acts, by means of its nose 383, on the lever 382, whereby the latter is swung in the clockwise direction. The lever 378a, in articulated connection with the lever 382, is hereby swung in the anticlockwise direction against the action of its spring 378c in which swinging movement the shaft 353 and the crossfooter master wheel detents 354 and 369, as well as the release fingers 353b and 353a participate, whereby the master wheels 362 and 372 are unlocked, and the toothed wheels located in the cross totalizers Q1 and Q2 are released. It will be understood that the units order drive wheels 360, (Fig. 17), of the respective cross totalizers Q1 and Q2, are equipped with a detent (not shown) similar to the detent 457, (Fig. 18), for the units wheel of each column totalizer.

Also that the tens and higher order drive wheels 360 of the cross totalizers Q1 and Q2 are provided with supporting levers (not shown) for the carrying pinions, similar to the supporting levers 469, etc. of Fig. 18, and with punctuation stops similar to the stops S (Fig. 18).

The outer ends of the release fingers 353a and 353b operate the detents and supporting levers of the respective cross totalizers exactly as the release finger 202 (Figs. 8 and 18), operates the detents 457 and levers 469, etc. of the respective column totalizers.

Reference may be made to Figs. 1 and 3 of U. S. patent to Schluns, No. 2,132,192, October 4, 1938, application filed January 10, 1928, for an illustration of an equivalent structure. Since the coupling member 375 (Figure 16) is not in engagement with the coupling member 377 and therefore the driving or master wheel 372 is not acted upon, the release of the master wheel 372 by the pawl 369 is unimportant.

In the further rotation of the three cams 69 (Figure 6) 71, 72, the roller 168, rotatably mounted on the lever 167, moves from the elevated part of the cam 72, on to the lower part of the same. As a result of this, the draw-bar 170 (Figure 8) is displaced in the direction of the arrow $a$ under the action of its spring 171. The incline 173a, of the slot 173x, of the rod 170, hereby acts on the roller 175 of the calculating sector 174, whereby this is swung in the anti-clockwise direction. Since the teeth 177 of the calculating sector 174, are in engagement with the toothed wheel 159, the driving or master wheel 362 (Figures 13 and 16) of the cross totalizer Q1 is rotated in the subtractive direction, by way of the parts 158, 162 (Figure 14) 328, 325, 323 (Figure 16) 378, 376 and 363, until the number roller of the hundreds place of the cross totalizer Q1, which shows a "1," has moved from "1" to "0" in which case, as already mentioned, a further rotation of this number roller is not possible since the wheel 360 (Fig. 17) of the next higher decimal place (Thousands place) in the cross totalizer Q1, is held fast by the aligning detent 352 which is locked by the nose 350 (Figure 13) of the slide 342. The calculating segment 174 (Figure 8) will be able, therefore, only to rotate through one unit. Accordingly, the master wheel 189 is also rotated, by the parts 158, 180, 187, 186 likewise only through one unit, whereby in the hundreds decimal place of the column totalizer T7, a "1" is registered.

By the swinging-out movement of the calculating segment 174 through one unit, the lower arm 204, (Fig. 8), of this segment moves the number key striking yoke 206, 216, 213, forwards through one unit, whereby the number typing key lever 35, corresponding to the value "1" is selected, which key is depressed by the cam 71 (Figure 6) by the roller 166, lever 165, shaft 87, and arms 222, 219 as described in Patent No. 2,236,642. As a result of the operation of the type bar the paper carriage moves one step to the left. Before, however, the carriage shift takes place, the slide 134 (Figure 8) has been moved upwards again by the cam 71 to effect the various locking operations.

As soon as the paper carriage has moved so that the tens decimal wheels of the column totalizer T7 and of the cross totalizer Q1 have meshed with their respective master wheels 189 and 362, the operations—since the key 329 (Figure 13) is held depressed—are repeated, whereby the number roller of the cross totalizer Q1, showing an "8" is moved to zero, while in the tens decimal wheel of the cross totalizer T7 an "8" appears, and after the number "8" has been typed, the paper carriage again moves one step to the left.

Consequently, the units decimal wheels of the column totalizer T7, and of the cross totalizer Q1, are in the working position in which the operations are again repeated. After the "clearing" of the units decimal wheel has been completed the column totalizer engages in letter spacing direction to the punctuation space.

A punctuation mark can be printed by depressing the proper key in the alphabet keyboard 32, which will not affect the calculating operations, but in case a printed punctuation is not desired, the paper carriage is moved one step to the left by means of the space keys, whereby the tenths decimal wheels of the column totalizer T7, and of the cross totalizer Q1, mesh with their respective master wheels.

Now, the same operations are repeated in the tenths decimal place of the column totalizer T7, and of the cross totalizer Q1—as the key 329 is still held depressed—whereby the tenths decimal wheel of the cross totalizer Q1 moves to zero, and on the tenths decimal wheel of the column totalizer T7 a "3" is visible.

When in the manner already described, the column totalizer T7 and the cross totalizer Q, are now moved so that their hundredths decimal wheels are in the working position and the "zero" is typed on the paper, a further carriage step follows.

Consequently, the column totalizer T7 is positioned so that the nose 87s' (Figure 9) of the lever 87s, lies in the space 87t' formed by the cam bars 87t of the two column totalizers T7 and T8. The lever 87r, in consequence of the pull of the spring 87w, on the rod 87n, swings in the clockwise direction and the rod 87n moves downwards. The pin 87k of the rod 87n, hereby presses on the member 87j, whereby the rod 87i is moved downwards. The locking lever 87d is thereby swung in the anti-clockwise direction, whereby the lug 87c of the lever 87d, rests in front of the nose 87b of the lever 87a and, accordingly, a swinging movement of the lever 87a, and of the shaft 87 in the clockwise direction is not possible. In consequence of this, the arms 219 and 222 fixed on the shaft 87 (Figure 8) cannot swing down. A downward movement of the number key striking bar 216, cannot therefore take place. In this case, therefore, the lock 199 would be superfluous. It must, however, on the other hand, be present in order to provide a lock for the comma place, in which case the parts controlled by the cross totalizer selecting cam bar 87t (Figure 9) on the column totalizer occupies the position according to Figure 9, in which, locking of the lever 87a cannot occur.

Through the swinging movement of the lever 87d round the pivot 87e in the clockwise direction, the nose 87d" of the lever 87d (Figure 9) comes into operative relation to the hook 98" of the bar 98.

When in the rotation of the cam series 72, 71, 69 (Figure 6) the lever 114 is swung by the cam 72 round the shaft 68 in the opposite direction to that of the arrow $m$, whereby the parts 111, 100, 99 and 101 are swung in the clockwise direction, the nose 87d" (Figure 9) of the lever 87d is laid, at the end of this movement against the edge 98' of the hook 98" of the bar 98, and holds this bar together with the parts 101, 100, 99, 111 fast in this position. The nose 114x (Figure 6) of the lever 114 hereby stands in the path of the nose 80 of the pawl 74. Shortly before the end of the revolution of the cam series 72, 71, 69 the cam 69 acts on the lever 120 and swings this against the action of the spring 123, so the lug 120c of the locking bar 110 is released. The locking bar 110 is now swung back in the clockwise direction on the shaft 99 by the springs 110b which have been tensioned by the swinging of the parts 111, 100, 99 and 101 in the clockwise direction. The nose 330a (Figure 13) of the total key lever 330 is hereby released from the flange 110g of the locking bar 110, so that the lever 330 of the total key 329 (T. C.) can return into its rest position under the action of the spring 338 (Figure 13). Accordingly, the key locking bar 98 also returns into its initial position under the action of the spring 109, whereby the lug 98x of the latch bar 98 can be laid against the stop 103a of the bearing member 103, since the projection 330b of the total key lever 330 which in the meantime has been raised, no longer prevents this. At the end of the revolution of the cam series 72, 71, 69 the nose 80 of the coupling pawl 74 is contacted by the nose 114x of the lever 114, whereby the pawl 74 (Figure 6) is disengaged from the wheel 73 and the rotation of the cam series is thus interrupted.

According to the foregoing description, therefore, a totalizer on the machine is automatically cleared at one operation in which the total key 329 (T. C.) is automatically held depressed during the clearing operation, and at the termination of the total-taking operation is automatically released again. As soon as the total key 329 (Figure 13) is released, the latch bar 98 (Figure 6) under the action of its spring 109, swings in the anti-clockwise direction round its own pivot axis, whereby the nose 98x rests again in front of the projection 103g.

Now, the amount "4,30" registered in the cross totalizer Q2, is written out of the same and transferred into the column totalizer T8. To this end, it is again necessary first to depress the corresponding tabulator key in order that the units decimal wheel of the column totalizer T8 and the units decimal wheel of the cross totalizer Q2 move into the working position. The column totalizer T8 is equipped with a cam 378y, so that as the column totalizer arrives at the calculating zone, the leading end of its cam 378y will wipe over the upper end 378t of the bellcrank 378, and rock the bellcrank counterclockwise (Fig. 16). This movement is transmitted through the link 378p to the arm 378k to rock the latter against the tension of the spring and shift the clutch sleeve 378 to the right to disconnect the clutch member 363 from the master wheel 362 of the cross totalizer Q1, and connect the clutch member 377 with the master wheel 372 of the cross totalizer Q2. Then, the TC key 329 (Figure 13) is again depressed and held depressed until the zero of the hundredths decimal wheel has been typed on the paper. In the depression of the TC key and the writing out of the amount "4,30" from the totalizer Q2 and the registration of the same amount in the column totalizer T8, the same procedure takes place, as in the writing out of the amount "184.30" from the cross totalizer Q1, for which reason this will not be described in detail. If the zero of the hundredths wheel has been typed on the paper, then a carriage step results whereupon the coupling 69, 71, 72 automatically comes to rest.

Totals of column totalizers

Now, let it be assumed that at the end of the week or at the end of the month, the amounts registered in the column totalizers T1 to T8 are to be written out. To this end, the carriage return key is first depressed, whereby the paper carriage moves into its extreme right-hand position. Then, by means of the tabulator key, the carriage is moved to the left, until the hundreds wheel of the column totalizer T1 is located in the working position. It may still be remarked that the cross totalizers Q1 and Q2 are held by a locking lever 500 (Figure 1) in their left-hand positions and are thereby prevented from participating in the movement of the column totalizers concerned, by way of the coupling device s1 and s2 (Figure 1).

Now the TV-key 226a' (Figure 10) is depressed, whereby, by way of the parts hereinbefore described, the pawl 74 (Figure 6) moves into engagement with the toothed wheel 73, and the three cams, 69, 81, 72, participate in the revolutions of the shaft. In this case, also the pawl 74, remains in engagement with the toothed wheel 73, as long as the column total key lever 226 is held depressed, since in consequence of the face 226a (Figure 10) of the key lever 226, the part 114x (Figure 6) of the lever 114, cannot enter into the path of movement of the nose 80 of the pawl 74, and the nose 74a of this pawl cannot be brought out of engagement with the toothed wheel 73.

On the depression of the column total key lever 226 (Figure 10) the face 226c, acts on the face 227 of the lever 229, and swings the same in the anti-clockwise direction, whereby the link 235 is moved downwards in the direction of the arrow a against the action of the spring 240, which engages with the arm 239a of the forked lever 239. Since the lever 239 is in connection with the link 235, the three-armed lever 239 is swung round its axis 239x in the anti-clockwise direction. In this movement, the locking member 250, fixed to the arm 239b, moves so that it lies under the part 252 of the aligning tooth 253, so that this is held in engagement with the teeth of the driving wheels 188 of the column totalizer T1 to T8 lying opposite to it for the time being.

In consequence of the downward movement of the link 235 the lever 238 connected with it, and rigidly mounted on the shaft 192, as well as the shaft 192 are swung in the anti-clockwise direction. Since the lever 193 is likewise rigidly mounted on the shaft 192, this is also swung in the same direction. By the swinging movement of the lever 193, the toothed wheel 180 (Figures 10 and 8) is moved out of engagement with the toothed wheel 181, and into engagement with the toothed wheel 187, whereby the rotational movement, in consequence of cutting out the intermediate drive, 181, 183, is transmitted directly on to the main driving shaft 186 on which the column totalizer master wheel 189 is fast, and accordingly, the column totalizers T1 to T8 are acted on in the subtractive sense.

On the rotation of the three cams 69 (Figure 6) 71, 72, first the toothed wheel 159 is moved into engagement with the teeth 177 of the calculating sector 174, by way of the parts 69, 132, 133, 134, 137 (Figure 8) 143, 136, 148, 150 and 156. Further, the locking shaft 142, and the parts 199, 179, 203, 87 (Figure 9) 256 (Figure 10), 202, 418 (Figures 15 and 22) and 382, rigidly mounted thereon, are rotated in the clockwise direction by way of the parts 134, 137, 143, 136.

Moreover, in the swinging movement of the locking shaft 142, in the clockwise direction (Figure 15) the lever 384 is swung in the same direction, whereby the levers 354 and 369 as well as the release fingers 353b and 353a, are swung in the anti-clockwise direction by the parts 381, 378a. This is, however, unimportant, since the cross totalizers Q1 and Q2, as previously mentioned, are not located in the working position.

On the further rotation of the three cams 69, 71 and 72 (Figure 8), the calculating sector 174 is swung in the anti-clockwise direction by the cam 72 and the parts 168, 167, 170 (Figure 8) 173, 175 and since the toothed wheel 159 is in engagement with the teeth 177, of the calculating sector 174, the master wheel 189, of the column totalizer T1 is rotated from "2" to "0," by the parts 158, 180, 187 and 186. Further rotation of the wheel 188 of the hundreds order is not possible for the reasons hereinbefore described. By the swinging out of the calculating segment 174, the number key striking yoke 206, 216, 213, is simultaneously moved forwards through two units, whereby the number key lever corresponding to the value "2" is moved downwards by the cam 71 (Fig. 6) by way of the roller 166 and lever 165 and the "2" is typed on the paper. Hereupon, follows a carriage step to the left.

On writing out the remaining figures from the column totalizer T1 and the values out of the remaining column totalizers T2 to T8, the same operations take place. If one of the column totalizers T1 to T8 is to be cleared, the cams 69, 71, 72 come automatically to rest in the manner described on taking the total from the cross totalizer Q1. The corresponding tabulator key is then depressed whereby the next totalizer, T2, is brought into the working position. Thereupon, the TV-key is again depressed; whereby the same operations, as already described, are repeated. This procedure is carried out until all the column totalizers T1 to T8 register zero.

Sub total printing

The writing out of a sub-total is effected in the following manner.

First, the slide 391 (Figure 22) is moved by means of the knob, 392, in the arrow direction $x$, whereby the edge 394 acts on the slide 396, and displaces the same to the left. Consequently, the angle lever 399, jointed to the slide 396, is swung round the screw 400 in the anti-clockwise direction. The angle lever 399, acts upon the bar 402, downwards in the direction of the arrow $a$. The fork-shaped part 403 of the bar 402, now acts on the pin 404, of the cam shift lever 406, which carries the case shift key 409, whereby by way of known parts (not illustrated) the shift of the platen results and the typing of the sub-total on the paper is executed with inclined type.

On the displacement of the slide 391 (Figure 22) to the left, the incline 410 of the slide 391, acts on the slide 411 and displaces the same so far in the arrow direction $y$ against the action of its spring 416, until the nose 411a, of the slide 411, lies over the nose 418a, of the lever 418.

If, for example, the sub-total is to be taken from one of the cross totalizers Q1 and Q2, so the TC-key 329, is depressed, whereby the coupling is again operated in the manner already described, and the cams 69 (Figure 6) 72 and 71, displaced rotationally, and the aligning detents 352, (Figure 13) and 367, are brought into the locking position. The locking shaft 142, is hereby swung in the clockwise direction again, by way of the parts 133, 132, 134 (Figure 8), 137, 143 and 136, whereby the unlocking of the calculating mechanism and of the totalizers results. Moreover, the nose 418a (Figure 22) of the arm 418, releases the nose 411a, of the slide 411. On the rocking movement of the locking shaft 142 in the clockwise direction, however, the locking shaft 353, has been swung in the anti-clockwise direction by way of the parts 384, 383, 381 and 378a, whereby the angle lever 422 is swung in the clockwise direction by the lever 421, fixed on the shaft 353, and the pin-slot connection 423a, 423. Herewith, the usual back space key lever 426, is likewise swung in the clockwise direction, but only partially, by the pin 424 of the angle lever 422. Accordingly, the drawbar 431, jointed to the back space key lever 426, is displaced in the arrow direction $a$, whereby by way of the swing yoke 433, the parts 439 and 440 in turn jointed to it, are displaced in the arrow direction $x$. Moreover, the tooth 444, jointed to the part 440, by the screw 442 to the pawl 443, projects into the tooth space of the toothed wheel 445 lying opposite to it, but without, however, rotating the same in any way. The extent of the depression of the back space key lever 426 is therefore so arranged by the angle lever 422, that the tooth 444 of the pawl 443, just locks the tooth wheel 445, but is not capable of rotating same. Accordingly, the carriage rack, 453, and the carriage rigidly connected to it, are held fast by the parts 451 and 452, and as will be seen from the following, for such time until the slide 170 after completing its downward movement, has again taken up its upper position.

On the above mentioned downward movement of the slide 170, the edge 411b of the slide 411, located on it, slides along on the beak 418b of the nose 418a of the lever 418, and similarly when the slide 170 again moves upwards. As will now be clear from what has been described above, the cam 69 (Figure 6) is so formed that after the slide 170 (Figures 8 and 22) has completed its downward movement, the cam 69 swings the locking shaft 142 again in the anti-clockwise direction by the parts (Figure 6) 133, 132, 134 (Figure 8) 137, 145 and 136, whereby the locking of the calculating mechanism and of the totalizers is effected. On sub-total taking, however, in which the value is to remain in the totalizer, it is necessary that such value after it has been withdrawn through the downward movement of the slide 170, for the purpose of being typed on the paper, be registered again in the totalizer. The unlocking of the calculating mechanism and of the totalizers in contradistinction to the method of working described hitherto, must be maintained until the slide 170 has again taken up its upper position.

On the downward movement of the slide 170, therefore, this will swing the calculating sector 174, by its slot 173x and the roller 175 (Figure 8) of the calculating sector, whereby the value will be withdrawn from the corresponding cross totalizer Q1 or Q2, by the toothed wheel 159, which is in engagement with the calculating sector 174, and by the parts 158, 162 (Figures 13 and 14), 328, 325, 323 and 362 or 372, connected with the toothed wheel 159. Hereby, the number key lever striking yoke, 206, 216, 213, has naturally been moved forward over the number key concerned whereby the number corresponding to this number key is typed, and by the parts 54a (Figure 3) to 58c the loose escapement tooth (not illustrated) is disengaged from the escapement wheel 54f, (Fig. 3) in which, however, for the present—since the return pawl 444 (Figure 22) holds the paper carriage fast—no carriage step can take place. Since, now, as previously mentioned, on the upward movement of the slide 170, the edge 411b of the slide 411, mounted on it, contacts with the beak 418b of the nose 418a, of the lever 418, a swinging movement of the shaft 142 in the anti-clockwise direction is not possible. Accordingly, the wheel 159, is also held in engagement with the calculating sector 174, by the parts 136 (Figure 8), 148, 150, 155 and 156, while the back space key lever 426 is held depressed by the parts 142 (Figure 22), 384, 383, 382, 381, 378a, 353, 421, 422 and 424. The calculating mechanism and the totalizers, therefore, still remain unlocked during the upward movement of the slide 170. Consequently, this will swing the toothed sector 174, in the opposite direction of the arrow p, by its slot 173x and the roller 175 (Figure 8) and since the same is in engagement with the toothed wheel 159, the value just withdrawn will appear again in the totalizer. Since, now, on the one hand, during the upward movement of the slide 170, the locking shaft 142, is held swung in the clockwise direction by the slide 411 mounted on the slide 170, and on the other hand, the cam 69, (Figure 6) endeavours to swing the locking shaft 142 in the anti-clockwise direction, by the parts 133, 132, 134, (Figure 8), 137, 143, 145 and 136, in the upward movement of the draw-bar 134, a yielding connection must be provided. This is provided by the spring 145, arranged between the parts 136 and 137. As soon as the slide 170 (Figure 22) has arrived again in its upper position, the locking shaft 142, is capable, under the action of the tensioned spring 145, of swinging in the anti-clockwise direction, whereby the calculating mechanism and the totalizers are locked again and the back space key lever 426 (Figure 22) is released. In consequence of the release of the wheel 445 by the back space pawl 444, 443, the paper carriage can only then execute the carriage step previously released by the typing operation. The totalizer has then reached the next lower decimal wheel from which the sub-total is to be taken.

The operations just described are now repeated until the value has been withdrawn from the hundredths order, whereby when the totalizer has reached the comma position, the space-key must be depressed and the remaining digits are registered after which the cams 69, 71, 72 come to rest automatically.

Moreover, it may be remarked, that the back space key 426, 427 (Fig. 22), on depression of the space keys, (Figs. 1-3) is not depressed, since the locking shaft 142 in consequence of the comma locking member (Figure 18), cannot swing out and accordingly also no swinging out of the angle lever 422 occurs, by way of the parts 384, 383, 382, 381 (Figure 22) 378a, 353, 421.

If a sub-total is to be taken from a column totalizer, the procedure is exactly the same, only with this difference, that instead of the cross total key 329 (Figure 13), the column total key 226a' (Figure 10) is depressed.

As arises from a comparison of Figures 11 and 12, in the taking of totals and sub-totals, the aligning tooth 253, which is held locked by the part 250 (Figure 10) in the unlocking process, i. e. in the rotation of the locking shaft 142 in the clockwise direction, is swung by the pin-slot connection 255, 257 (Figure 11) in the clockwise direction, whereby its tooth 260 acts on the denominational gear wheel 188, standing in engagement with it, in the anti-clockwise direction, i. e. in the arrow direction x (Figure 21). By this means the unavoidable small clearance (or back lash) in the play of the wheel is overcome, so that if the driving or master wheel 189 (Figure 21) located in the lower decimal place is rotated in the arrow direction "x1," the clearance does not work out in the feeling direction. When, therefore, e. g. the wheel 188H, (Fig. 21), has been somewhat rotated in the arrow direction x by the aligning tooth 253, 260 in engagement with it, so the transfer wheel 475, 474, 473, in engagement with it has been slightly rotated in the arrow direction Z. If now, the wheel 188z is rotated by the driving master wheel 189, (Figure 21) in the arrow direction x2, so the tens shift tooth 464 (Figure 21) of the disk 465 of the wheel 188z, on striking the tooth of the carrying pinion 473 lying in its path no longer meets with clearance as such clearance was previously removed by the small rotation of the locking and aligning tooth 253. The result of this is, that the number wheel 481, by way of the gears 477 and 480, standing in engagement with the gear 188z, brings its "0" exactly opposite to the inspection aperture 481x (Figure 21). If this arrangement is not provided, then in the inspection aperture 481x, only half of the "0" and half of the "9" is visible which are naturally undesirable.

The aligning detents 352 (Figure 13) and 367, for the cross totalizers Q1 and Q2, act obviously in the same manner.

As is now clear from the foregoing, there is a place lost in each totalizer, namely, that of the "blind" wheel 493 (Figure 20) through the feeling method, in consequence of locking the next higher decimal wheel by the aligning detent.

I claim:

1. In a typewriting and calculating machine, conditionable for total-printing and clearing operations, the combination with a register; of means for operating said register, including a reciprocatory differential member, and a power-driven actuating member therefor; a connection between the differential member and the register shiftable into and out of operative relation to said differential member to normally disconnect the differential member and the register prior to movement of the differential member in one direction only; power-driven means to shift said connection; settable means effective upon the connection-shifting means to predetermine that the connection shall remain in operative relation to said differential mechanism during movement of the latter in both directions, in subtotal-taking operations; and means to adjust said settable means to and retain it in its effective position when a sub-total-taking operation is desired.

2. In a total-taking machine of the class described, the combination with a register; of means to operate said register, including a reciprocatory differential member, a power-driven actuating member therefor, and a connection between the differential member and the register shiftable into and out of operative relation to said differential member, to connect the differential member with the register during movement of the differential member in one direction only; means to shift said connection, including a rock shaft, and a power-controlled means for operating said rock shaft; an arm oscillating with said rock shaft and a normally idle abutment member shiftable into the path of the arm to prevent disconnection of the differential member and the register in subtotal-taking operations.

3. In a total-taking machine of the class described; a carriage escapement mechanism to feed the carriage in letter-spacing direction; back-spacing mechanism for the carriage; and a register; of register operating means, including a reciprocatory differential member; transmission mechanism between the differential member and the register, including a connection shiftable into and out of operative relation to said differential member; means to shift the connection to disconnect the differential member and the register just prior to travel of the differential member in one direction; means operable by the connection-shifting means, to partially actuate the carriage back-spacing mechanism to prevent feeding movement of the carriage; and means settable into and out of effective position relatively to the connection shifting means to delay the return of the partially actuated carriage back spacing mechanism until the differential member completes its back and forth reciprocation in subtotaling operations.

4. In a total-taking machine of the class described; a carriage escapement mechanism to feed the carriage in letter-spacing direction; and a register; of register operating means, including a reciprocatory differential member; transmission mechanism between the differential member and the register, including a connection shiftable into and out of operative relation to said differential member; means to normally shift the connection to disconnect the differential member and the register prior to travel of the differential member in one direction; settable means effective to retain the shiftable connection in its operative relation to said differential member during travel of the differential member in both directions; and means operable by the connection-shifting means, to lock the carriage against letter-spacing movement during total-taking operations, while the differential member is travelling in one direction, said settable means effective to retain the carriage locked against letter-spacing movement during travel of the differential member in both directions in subtotal-taking operations.

5. In a total-taking machine of the class described, the combination with a travelling carriage; means to shift the carriage step by step in letter-spacing direction; locking mechanism for the carriage; and a register; of means to operate said register, including a reciprocatory differential member, a power-driven actuator for operating the differential member, a connection between the differential member and the register, shiftable into operative relation to said differential member before travel of said differential member in one direction and out of operative relation thereto before travel of the differential member in the opposite direction; power-driven means to shift the connection; means controlled by the connection-shifting means to cause the carriage-locking mechanism to lock and to release the carriage synchronously with the movement of the shiftable connection into and out of operative relation to the differential member; and settable means effective upon the connection-shifting means, to retain the connection in operative relation to the differential member throughout the travel of the differential member in both directions and, retain the carriage-locking means effective to lock the carriage against letter-spacing travel during movement of the differential member in both directions.

6. In a power-driven total-taking machine of the class described, the combination with a motor, a travelling carriage; means to shift the carriage step by step in letter-spacing direction; and a register; of means to operate said register, including a reciprocatory differential member, a power-driven actuator for the differential member, a shiftable connection between the differential member and the register, power-driven means to shift the connection into operative relation with the differential member prior to the movement of the latter in one direction and to shift the connection out of operative relation to the differential member prior to movement of the latter in the opposite direction; means controlled by the connection-shifting means to lock and to release the carriage synchronously with the movement of the shiftable connection into and out of operative relation to the differential member; and settable means effective to control the time of release of the carriage to the action of its letter-spacing means and the time of shifting of the connection, with relation to the reciprocatory travel of the differential member, in subtotal-taking operations.

7. In a power-driven total-taking machine of the class described, the combination with a motor, a travelling carriage; means to shift the carriage step by step in letter-spacing direction; and a register; of means to operate said register, including a reciprocatory differential member, a power-driven actuator for the differential member, a shiftable connection between the differential member and the register, power-driven means to shift the connection into operative relation with the differential member prior to the movement of the latter in one direction and to shift the connection out of operative relation to the differential member prior to movement of the latter in the opposite direction, including a yieldable element between the drive shaft and the shiftable connection; and settable means effective upon the connection-shifting means to retain the connection in operative relation to the differential member throughout travel of the differential member in both directions in a subtotal-taking operation.

8. In a machine of the class described, the combination with a travelling carriage; means to shift the carriage step by step in letter-spacing direction; back-spacing mechanism for the carriage; and a register; of means to operate said register, including a reciprocatory differential member, a power-driven actuator for operating the differential member, a connection between the differential member and the register, shiftable into operative relation to said differential member prior to travel of said differential member in one direction and out of operative relation thereto prior to travel of the differential member in the opposite direction; power-driven means to shift the connection; and means controlled by the connection-shifting means to cause the back-spacing mechanism to lock and to release the carriage synchronously with the movement of the shiftable connection into and out of operative relation to the differential member.

9. In a power-driven typewriting-accounting machine, having a travelling carriage, the combination with a totalizer including a plurality of order wheels; a differential member common to the several order wheels; a transmission means for the differential member, including a master wheel, with which the order wheels successively engage, power-driven means to releasably lock the transmission means against operation; and means to reverse the direction of rotation of the master wheel for addition and subtraction; of means to place the differential member under control of the order wheels for total taking, including a total-taking key; means to lock the total key depressed; means operable by the total key to detain the numeral wheels in their zero positions as they are successively rotated back to zero position, incident to printing the total;

means operable by the total key to initiate the operation of the means for releasing the transmission locking means and for restoring it to normal; total key operated means to set the state control to or to maintain it in subtract position, and automatically operating means to release the total key as the order wheel of lowest denomination and the master wheel disengage.

10. In a motor-driven typewriting-accounting machine, having a travelling carriage, and carriage-escapement mechanism; the combination with a totalizer having a plurality of order wheels; a master wheel with which the order wheels are successively connected incident to the letter-spacing travel of the carriage; and a differential member for the master wheel; of state controlling mechanism between the differential member and the master wheel; an actuator for the differential member; a total key to initiate a total operation and to adjust the state control mechanism; means operable by the total key to detain the successive order wheels in their clear positions; motor-driven means to operate the actuator; a shiftable connection also between the differential member and the master wheel; and a second motor-driven means to automatically engage and disengage the differential member and the shiftable connection in timed relation with the clearing of the order wheels by the differential member.

11. In a power-driven typewriting-accounting machine, having a travelling carriage, a motor; and a drive shaft rotated thereby, the combination with a totalizer, including a plurality of order wheels; of a differential mechanism, including a master wheel engageable with the totalizer wheels successively; a differential member; transmission mechanism between the differential member and the master wheel; an actuator for the differential member; means operable by the drive shaft to control the excursions of the differential member as determined by the totalizer wheels, and to restore the actuator and its differential member to their normal positions; a normally ineffective connection in the transmission mechanism between the differential member and the master wheel; a second means operable by the drive shaft to automatically shift the connection into and out of its effective position relatively to the differential member in timed relation with the direction of movement of said differential member; a total key; means controlled by the total key to initiate the rotation of the drive shaft; means to lock the total key depressed to insure successive revolutions of the drive shaft; means to automatically release the total key after the totalizer wheel of lowest denomination disengages from the master wheel; and means settable by the operator to determine whether or not the normally ineffective shiftable connection shall remain effective throughout a complete excursion of the differential member.

12. In a power-driven typewriting-accounting machine, the combination with a travelling carriage, a drive shaft and a totalizer, including a plurality of decimal order wheels; of a reciprocatory differential member; an actuator therefor; means operable by the drive shaft to release the actuator for operation and to restore the actuator to normal; a master wheel operable by the differential member, and with which the totalizer wheels successively engage; a normally ineffective connection between the differential member and the master wheel; means operable by the drive shaft in timed relation with the back and forth strokes of said actuator to automatically shift the connection into effective position prior to one of said strokes, and out of effective position prior to the remaining stroke; a normally idle clutch interposed between the drive shaft and the said connection-shifting means; a total key, depression of which sets the clutch for operation; means to hold the key depressed; state control means settable by the total key; and means to automatically release the total key to enable disconnection of the clutch incident to the disengagement of the totalizer wheel of lowest order and the master wheel.

13. In a power-driven typewriting-accounting machine, the combination with a travelling carriage; a motor; a drive shaft; a totalizer, including a plurality of order wheels; and a master wheel engageable by the order wheels successively; of a differential member shiftable back and forth; an actuator for the differential member; means to propel the actuator in one direction; means operable by the drive shaft to release the actuator and the differential member for operation and to restore them to normal; a normally idle clutch between the drive shaft and said means operable by the drive shaft for releasing the actuator for operation by its propelling means; a normally ineffective connection between the differential member and the master wheel; means operable by the drive shaft to render the connection effective prior to travel of the differential member in one direction only; a special key to control the clutch; locking means to retain the special key depressed; and carriage-controlled means to release the special key for return incident to the disengagement of the order wheel of lowest order from the master wheel.

14. In a power-driven typewriting-accounting machine, the combination with a travelling carriage, a motor; a drive shaft rotated thereby; and a totalizer, including a plurality of order wheels; of a differential mechanism, including a differential member, and a master wheel engageable by the totalizer wheels successively; means operable by the shaft to release the differential mechanism for movement in one direction and to restore the differential mechanism to normal position at each rotation of the shaft; a normally idle clutch to connect said shaft-operated means and the shaft; means driven by the shaft to positively disengage the clutch; a normally ineffective connection between the differential member and the master wheel; means operable by the drive shaft to automatically render said connection effective and ineffective in timed relation with the initial and return movements of the differential member respectively; a special key, depression of which controls the clutch for operation; means to hold the special key depressed in total and sub-total-taking operations; state control means adjusted by the special key; and means settable prior to depression of the special key to vary the operation of the normally ineffective connection in subtotal-taking operations.

15. In a power-driven typewriting-accounting machine, the combination with a motor; a travelling carriage; an escapement therefor; a totalizer having a plurality of denominational order wheels; and a differential mechanism with which the order wheels engage successively; of a special key; means controlled by the special key to place the differential mechanism under control of the order wheels of the totalizer for total and sub-total taking; locking means to hold the order wheels against rotation in one direction as soon as they are cleared denomination by denomination in total-taking operations; and settable means to block the operation of the locking means and of the escapement of the carriage order by order in a subtotaling operation until the differential mechanism is in its home position.

16. In a power-driven typewriting-accounting machine, the combination with a travelling carriage; an escapement therefor; a totalizer having a plurality of denominational order wheels; and a master wheel with which the successive order wheels engage; a motor; a drive shaft; of a differential member, the excursions of which are controllable by the totalizer wheels; means operable by the drive shaft to reciprocate the differential member; a normally disengaged clutch to connect said means and the drive shaft; means to transmit motion from the differential member to the master wheel; transmission control means to render the transmission means effective during movement of the differential member in one direction and ineffective during movement of the differential member in the opposite direction; means operable by the drive shaft to lock the transmission means and the active totalizer wheel during movement of the differential member in said opposite direction, and to release the transmission means and the active totalizer wheel for operation during movement of the differential member in said first-named direction; the transmission means including reverse gearing; and special clutch-tripping means operable to initiate a total and clearing operation, and to control the reverse gearing.

17. In a power-driven typewriting-accounting machine, the combination with a travelling carriage; an escapement therefor; a totalizer having a plurality of denominational order wheels; and a master wheel with which the successive order wheels engage; a motor; a drive shaft; of a differential member, the excursions of which are controllable by the totalizer wheels; means operable by the drive shaft to reciprocate the differential member; a normally disengaged clutch to connect said means and the drive shaft; means to transmit motion from the differential member to the master wheel; transmission control means to render the transmission means effective during movement of the differential member in one direction and ineffective during movement of the differential member in the opposite direction; means operable by the drive shaft to lock the transmission means and the active totalizer wheel during movement of the differential member in said opposite direction, and to release the transmission means and the active totalizer wheel for operation during movement of the differential member in said first-named direction; settable means effective during the movement of the differential member in said opposite direction, to prevent the shift of the locking means to effective position, and to prevent the operation of the transmission control means to render the transmission means ineffecive, the transmission means including reverse gearing; and special clutch-tripping means to initiate total and subtotal operations, and to control the reverse gearing.

18. In a power-driven typewriting-accounting machine, the combination with a travelling carriage; an escapement therefor; a totalizer having a plurality of denominational order wheels; and a master wheel with which the successive order wheels engage; a motor; a drive shaft; of a differential member, the excursions of which are controllable by the totalizer wheels; means operable by the drive shaft to reciprocate the differential member; means to transmit motion from the differential member to the master wheel; transmission control means to render the transmission means effective during movement of the differential member in one direction and ineffective during movement of the differential member in the opposite direction; means operable by the drive shaft to lock the transmission means and the active totalizer wheel during movement of the differential member in said opposite direction, and to release the transmission means and the active totalizer wheel for operation during movement of the differential member in said first-named direction; including a yielding connection between the drive shaft and the locking and transmission control means to enable the return of the shaft-driven elements of the connection while the locking and transmission control means are retained ineffective and effective, respectively, said yielding connection operable to restore the transmission control and the locking means to normal as the shaft completes a rotation.

19. In a power-driven typewriting-accounting machine, the combination with a travelling carriage; an escapement therefor; a totalizer having a plurality of denominational order wheels; and a master wheel with which the successive order wheels engage; a motor; a drive shaft; of a differential member, the excursions of which are controllable by the totalizer wheels; means operable by the drive shaft to reciprocate the differential member; means to transmit motion from the differential member to the master wheel; transmission control means to render the transmission means effective during movement of the differential member in one direction and ineffective during movement of the differential member in the opposite direction; means operable by the drive shaft to lock the transmission means and the active totalizer wheel during movement of the differential member in said opposite direction, and to release the transmission means and the active totalizer wheel for operation during movement of the differential member in said first-named direction; means under control of the locking means to lock the carriage against letter-spacing movement while the transmission means is effective; settable means effective during the movement of the differential member in said opposite direction, to prevent the shift of the locking means to effective position, and to prevent the operation of the transmission control means to render the transmission means ineffective, and to retain the carriage-locking mechanism effective; the transmission means including reverse gearing; and special clutch-tripping means to initiate total and subtotal operations, and to control the reverse gearing.

20. In a power-driven typewriting-accounting machine, the combination with a travelling carriage; an escapement therefor; a totalizer having a plurality of denominational order wheels; and a master wheel with which the successive order wheels engage; a motor; a drive shaft; of a differential member, the excursions of which are controllable by the totalizer wheels; means operable by the drive shaft to reciprocate the differential member; means to transmit motion from the master wheel to the differential member; means to lock the transmission means and the active totalizer wheel during movement of the differential member in said opposite direction, and to release the transmission means and the active totalizer for operation during movement of the differential member in said first-named direction; transmission control means operable by the transmission locking means, to render the transmission means effective during movement of the differential member in one direction and ineffective during movement of the differential member in the opposite direction; means under the control of the transmission locking means to lock the carriage against letter-spacing movement while the transmission means is effective; a single operating means actuated by the drive shaft to control the transmission locking means and therethrough the transmission control, and the carriage-locking means; the transmission means including reverse gearing; and special clutch-tripping means operable to initiate a total and clearing operation, and to control the reverse gearing.

21. A power-driven total-taking writing-adding machine of the class described, having a travelling carriage; a register including a plurality of denominational wheels; a reciprocatory differential member to communicate movement to the denominational wheels seriatim; power-driven means to control the reciprocation of the differential member; transmission means between the differential member and the register, including a connection shiftable to establish operative relation between the differential member and the denominational wheels prior to travel of the differential member in one direction, and shiftable prior to travel of the differential member in the opposite direction, to disestablish operative relation between the differential member and the denominational wheels; power-driven means to shift said connection in timed relation with the reciprocations of the differential member into and out of operative position; state control mechanism for the register; normally ineffective register wheel aligning and detenting means; and special means operable prior to the operation of the differential member to set the state control mechanism to transmit the movement of the differential member to the denominational wheels substractively and to simultaneously render effective the register wheel aligning and detenting means in total taking operations.

HUGO ERNST KÄMMEL.